United States Patent
Ciochina et al.

(10) Patent No.: US 11,496,203 B2
(45) Date of Patent: Nov. 8, 2022

(54) COMMUNICATION DEVICES AND METHODS WITH BEAMFORMING TRAINING

(71) Applicant: Sony Corporation, Tokyo (JP)

(72) Inventors: Dana Ciochina, Stuttgart (DE); Thomas Handte, Stuttgart (DE); Nabil Sven Loghin, Stuttgart (DE); Felix Fellhauer, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 16/343,416

(22) PCT Filed: Oct. 27, 2017

(86) PCT No.: PCT/EP2017/077659
§ 371 (c)(1),
(2) Date: Apr. 19, 2019

(87) PCT Pub. No.: WO2018/078126
PCT Pub. Date: May 3, 2018

(65) Prior Publication Data
US 2019/0319693 A1    Oct. 17, 2019

(30) Foreign Application Priority Data

Oct. 27, 2016  (EP) .................................. 16195985
Jan. 13, 2017  (EP) .................................. 17151352
May 4, 2017   (EP) .................................. 17169587

(51) Int. Cl.
*H04L 12/43*    (2006.01)
*H04B 7/08*     (2006.01)
(Continued)

(52) U.S. Cl.
CPC ............ *H04B 7/088* (2013.01); *H04B 7/0452* (2013.01); *H04B 7/0695* (2013.01); *H04W 48/16* (2013.01)

(58) Field of Classification Search
CPC .... H04B 7/088; H04B 7/0452; H04B 7/0695; H04B 7/0617; H04B 7/0408; H04B 7/04;
(Continued)

(56) References Cited

U.S. PATENT DOCUMENTS 8,184,572 B1 *  5/2012  Kraus ............... H04W 72/1257
                                                    370/322
2006/0057964 A1   3/2006  Roy et al.
(Continued)

FOREIGN PATENT DOCUMENTS

CN    104639289 A    5/2015
CN    104698430 A    6/2015
(Continued)

OTHER PUBLICATIONS

International Search Report dated Jan. 25, 2018 for PCT/EP2017/077659 filed on Oct. 27, 2017, 19 pages.
(Continued)

*Primary Examiner* — Nguyen H Ngo
(74) *Attorney, Agent, or Firm* — Xsensus LLP

(57) ABSTRACT

A communication device, e.g. an access point, for RF-based communication with another communication device, e.g. a station, comprises antenna circuitry configured to transmit and receive RF signals and beamforming circuitry configured to perform beamforming. The beamforming circuitry controls the antenna circuitry to transmit data, in a beacon transmission phase prior to the beamforming training phase, using a set of third directive transmit beams in subsequent time slots and to listen, in the beamforming training phase, using a set of first directive receive beams in subsequent
(Continued)

time slots that is different from the set of third directive transmit beams.

19 Claims, 14 Drawing Sheets

(51) Int. Cl.
*H04B 7/0452* (2017.01)
*H04B 7/06* (2006.01)
*H04W 48/16* (2009.01)

(58) Field of Classification Search
CPC ...... H04B 7/0491; H04B 7/0413; H04B 7/06; H04B 7/08; H04W 48/16; H04W 8/005; H04W 16/28; H04W 72/046; H04W 72/042; H04W 72/0446; H04W 72/12; H04W 74/00; H04W 72/04
USPC .... 370/229, 230, 230.1, 236, 252, 278, 282, 370/328, 329, 330, 334, 336, 343, 345, 370/347, 348, 359, 365, 419, 436, 437, 370/458, 468, 480
See application file for complete search history.

(56) References Cited

U.S. PATENT DOCUMENTS

| | | | |
|---|---|---|---|
| 2009/0232240 A1 | 9/2009 | Lakkis | |
| 2009/0238156 A1 | 9/2009 | Yong et al. | |
| 2011/0034191 A1* | 2/2011 | Leabman | H01Q 3/2605 455/501 |
| 2011/0235600 A1* | 9/2011 | Sun | H04W 72/1215 370/329 |
| 2013/0044695 A1 | 2/2013 | Xu et al. | |
| 2013/0051302 A1* | 2/2013 | Kim | H01Q 25/002 370/312 |
| 2014/0307654 A1 | 10/2014 | Kim | |
| 2015/0230263 A1 | 8/2015 | Roy | |
| 2015/0244432 A1 | 8/2015 | Wang | |
| 2015/0263424 A1 | 9/2015 | Sanford et al. | |
| 2015/0341105 A1 | 11/2015 | Yu et al. | |
| 2015/0382171 A1* | 12/2015 | Roy | H04Q 3/08 370/329 |
| 2016/0065287 A1 | 3/2016 | Kim et al. | |
| 2016/0088558 A1 | 3/2016 | Chu et al. | |
| 2016/0191132 A1 | 6/2016 | Rajagopal | |
| 2018/0310283 A1* | 10/2018 | Deenoo | H04W 72/042 |
| 2019/0081688 A1* | 3/2019 | Deenoo | H04B 7/088 |
| 2019/0335367 A1* | 10/2019 | Yue | H04W 36/00 |
| 2020/0220607 A1* | 7/2020 | Lou | H04B 7/0695 |

FOREIGN PATENT DOCUMENTS

| | | |
|---|---|---|
| CN | 104969588 A | 10/2015 |
| CN | 105122664 A | 12/2015 |
| CN | 105790806 A | 7/2016 |
| JP | 2011526429 A | 10/2011 |
| JP | 2016-509818 A | 3/2016 |
| JP | 2016040951 A | 3/2016 |
| WO | 2011/034734 A1 | 3/2011 |
| WO | 2011/043901 A2 | 4/2011 |
| WO | 2013/184323 A1 | 12/2013 |
| WO | 2015/089303 A1 | 6/2015 |
| WO | 2015/099750 A1 | 7/2015 |
| WO | 2015132827 A | 9/2015 |
| WO | 2016/108589 A1 | 7/2016 |

OTHER PUBLICATIONS

International Search Report dated Dec. 21, 2017 for PCT/EP2017/077655 filed on Oct. 27, 2017, 14 pages.
IEEE, "Wireless LAN Medium Access Control (MAC) and Physical Layer (PHY) Specifications", IEEE P802.11-REVmcTM, D8.0, Aug. 2016, pp. 1-3648.
Noh et al., "Multi-Resolution Codebook and Adaptive Beamforming Sequence Design for Millimeter Wave Beam Alignment", Department of Electrical and Computer Engineering, Purdue University, 2015, pp. 1-15.
Nitsche et al., "IEEE 802.11ad: Directional 60 GHz Communication for Multi-Gbps Wi-Fi", IEEE Communications Magazine, vol. 52, No. 12, 2014, pp. 132-141.
IEEE, "Wireless LAN Medium Access Control (MAC) and Physical Layer (PHY) Specifications", Amendment 3: Enhancements for Very High Throughput in the 60 GHz Band, IEEE Std. 802.11 adTM, Dec. 28, 2012, pp. 1-598.
IEEE, "Wireless LAN Medium Access Control (MAC) and Physical Layer (PHY) Specifications", IEEE P802.11 TM, Mar. 29, 2012, pp. 1-2695.
Maltsev et al., "Enhanced SLS BF flow for efficient AP-STA access in dense environment", Intel Presentation, IEEE 802.11-16, Nov. 2016, pp. 1-21.
James Wang et al., "Scalable Beamformingfor 11ay", IEEE 802.11-16/0099r0, Jan. 2016, 13 pp.
Yan Xin et al., Huawei Technologies, "Channel Access in A-BFT over Multiple Channels", IEEE 802.11-16/0101r0, Jan. 2016, 9 pp.
Japanese Office Action dated Sep. 23, 2020, issued in corresponding Japanese Patent Appication No. 2019-522934.
China Office Action dated Dec. 17, 2020, for corresponding China Patent Application 201780066934.7, 20 pages.
IEEE Computer Society, IEEE Standard for Information technology—Telecommunications and information exchange between systems Local and metropolitan area networks—Specific requirements Part 11: Wireless LAN Medium, Access Control (MAC) and Physical Layer (PHY) Specifications Amendment 4: Enhancements for Very High Throughput for Operation in Bands below 6 G, Hz, Dec. 28, 2012, pp. 106-107.

* cited by examiner

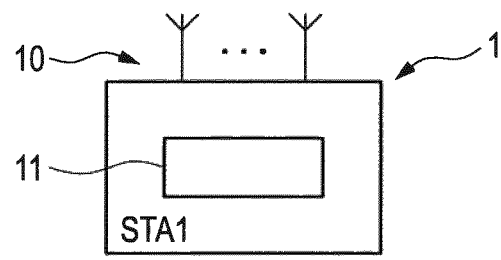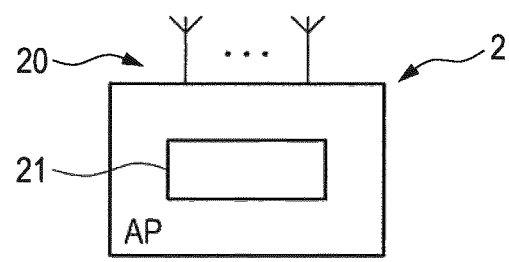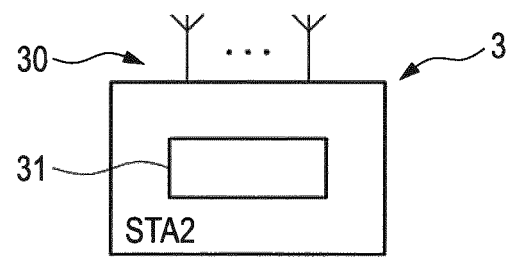
Fig. 1

| B0 | B1 | B2  B5 | B6 | B7  B9 | B10 B13 | B14 |
|---|---|---|---|---|---|---|
| CC Present | Discovery Mode | Next Beacon | ATI Present | A-BFT Length | FSS | IsResponderTXSS |
| 1 | 1 | 4 | 1 | 3 | 4 | 1 |

Bits:

| B15 B18 | B19 | B20 B26 | B27 B30 | B31 B36 | B37 B42 | B43 | B44 B47 |
|---|---|---|---|---|---|---|---|
| Next A-BFT | Fragmented TXSS | TXSS Span | N Bis A-BFT | A-BFT Count | N A-BFT in Ant | PCP Association Ready | Reserved |
| 4 | 1 | 7 | 4 | 6 | 6 | 1 | 4 |

Bits:

Fig. 8

| DD-A-BFT Length | FSS | Next DD-A-BFT | DD-A-BFT Count | N DD-A-BFT in Ant | Reserved |
|---|---|---|---|---|---|
| 3 | 4 | 4 | 6 | 6 | 1 |

Bits:

Fig. 10

| DD-A-BFT Length | FSS | Next DD-A-BFT | Fragmented DD-A-BFT | DD-A-BFT span | DD-A-BFT Count | N DD-A-BFT in Ant | Reserved |
|---|---|---|---|---|---|---|---|
| 3 | 4 | 4 | 1 | 7 | 6 | 6 | 1 |

Bits:

Fig. 11

| Order | Information | Notes |
|---|---|---|
| 1 | Timestamp | See 8.4.1.10 |
| 2 | Sector Sweep | See 8.4a.1 |
| 3 | Beacon Interval | See 8.4.1.3 |
| 4 | Beacon Interval Control | See Figure 8-34b. |
| 5 | DMG Parameters | See 8.4.1.46 |
| 6 | Clustering Control | Optional. See Figure 8-34c and Figure 8-34d. |
| 7 | DMG Capabilities | The DMG Capabilities element is optionally present. |
| 8 | Extended Schedule | The Extended Schedule element is optionally present. |
| 9 | RSN | The RSNE is optionally present if dot11RSNAEnabled is true. |
| 10 | Multiple BSSID | One or more Multiple BSSID elements are optionally present if dot11MgmtOptionMultiBSSIDEnabled is true. |
| 11 | DMG Operation | The DMG Operation element is optionally present. |
| 12 | Next DMG ATI | The Next DMG ATI element is optionally present. |
| 13 | DMG BSS Parameter Change | The DMG BSS Parameter Change element is optionally present. |
| 14 | Multi-band | The Multi-band element is optionally present if dot11MultibandImplemented is true. |
| Last − n | One or more elements can appear in this frame. These elements follow all other elements that are not vendor-specific elements and precede all other elements that are vendor-specific elements that are part of the Last field in the frame. Except for the Multi-band element, an element can be included only once in the frame. | Optional |
| Last | Vendor Specific | One or more vendor-specific elements are optionally present. These elements follow all other elements. |

Fig. 9

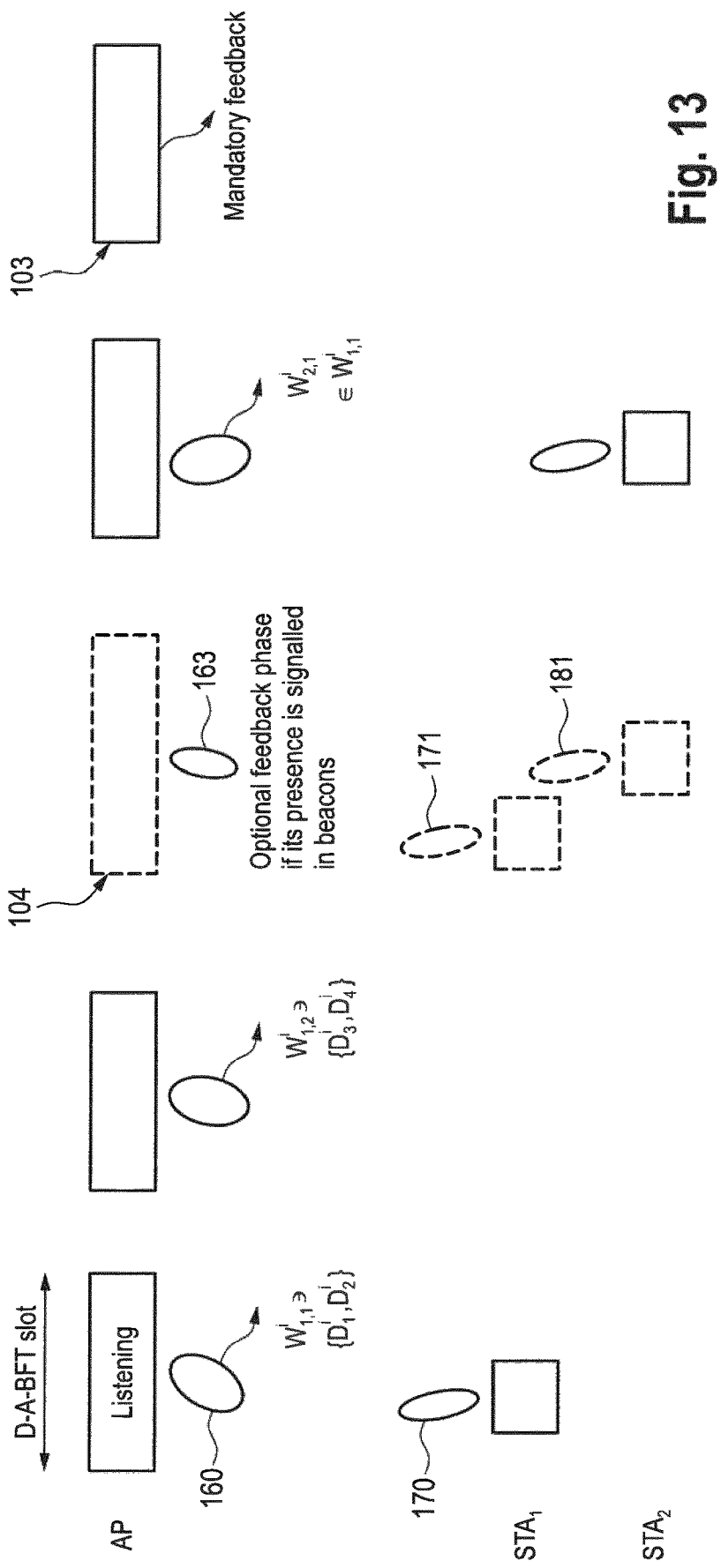

| L-STF | L-CEF | L-Header | Beacon body | B Element | TRNs |

AP TX beam: directive fix ($D_i$)　　　AP TX beam: directive fix ($D_i$)

STA RX beam: omni

STA RX beam: directive sweep

Fig. 15

| L-STF | L-CEF | L-Header | Beacon body | B Element | TRNs |

AP TX beam: directive fix ($D_i$)　　　AP TX beam: wide fix ($W_i$)

STA RX beam: omni

STA RX beam: directive sweep

Fig. 16

COMMUNICATION DEVICES AND METHODS WITH BEAMFORMING TRAINING

The present application is based on PCT filing PCT/EP2017/077659, filed Oct. 27, 2017, which claims priority to EP 16195985.3, filed Oct. 27, 2016, EP 17151352.6, filed Jan. 13, 2017, and EP 17169587.7, filed May 4, 2017, the entire contents of each are incorporated herein by reference. This disclosure is also related to co-pending U.S. application Ser. No. 16/343,409, which is entitled "COMMUNICATION DEVICES AND METHODS WITH BEAMFORMING TRAINING" filed concurrently with the present application, which is also incorporated herein by reference.

BACKGROUND

Field of the Disclosure

The present disclosure relates to different communication devices, such as a mobile station and an access point, which are configured for RF-based communication with each other. The present disclosure further relates to corresponding communication methods.

Description of Related Art

Communication systems in the 60 GHz frequency range suffer from strong free space path loss, which increases with frequency. For instance, a 60 GHz communication system has roughly 22 dB higher attenuation compared to a communication system operating at 5 GHz. To overcome the increased path loss, 60 GHz or any mmWave communication system employs beamforming, i.e. transmitter and/or receiver feature a steerable phased-array antenna (PAA), which can form directive beams towards the other communication device. Such beams have typically a high directivity and are spatially very narrow. The directivity in main direction increases with the number of antenna elements per PAA. In contrast, the half-power beam width (HPBW) defines the spatial width of a pattern decreases with increasing number of antennas. Thus, the more antennas per PAA, the higher the directivity and the smaller the HPBW. In order to make use of the PAA directivity for communications, beam alignment is crucial and of high importance for mmWave communication systems and RF communication systems, methods and devices in general.

Beamforming training for association is however a challenging problem due to i) lack of any knowledge at one of the communication devices, e.g. at the access point (AP), about other communication devices, e.g. the stations (STAs), that may want to associate, and ii) relatively scarce knowledge at STAs about the "good" sectors on which they can listen on. The latter is due to the fact that the STAs listen generally in quasi-omnidirectional mode. To tackle the first problem the IEEE 802.11ad and 802.11ay standards have designed a specific association beamforming interval in which STAs randomly choose slots in which they opportunistically send directive beams to the AP, containing information about their address and AP transmit beams best received during the beacon intervals.

The problems with this approach are collision probability since APs listen omnidirectional so that frames from multiple STAs can collide, especially in dense scenarios, and coverage problems since the directivity gain at STAs can be significantly lower than at the AP or STAs can be far from the APs, in which case the beams transmitted by the STAs do not reach the APs.

There is a need in such communication systems to yield higher antenna gain in an association phase, thus increasing the AP coverage and enabling long-range association and data transmission. Furthermore, it is desired to reduce the collision probability among STAs (first communication devices) during association phase.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admit-ted as prior art against the present disclosure.

SUMMARY

It is an object to provide communication devices and corresponding communication methods yielding a higher antenna gain, enabling long-range association and data transmission, and/or reducing the collision probability in association phase.

According to an aspect there is provided a (first) communication device, e.g. an access point, for RF-based communication with another communication device, said communication device comprising:
  antenna circuitry configured to transmit and receive RF signals, and
  beamforming circuitry configured to perform beamforming and to perform beamforming and to control the antenna circuitry to transmit data, in a beacon transmission phase prior to the beamforming training phase, using a set of third directive transmit beams in subsequent time slots and to listen, in the beamforming training phase, using a set of first directive receive beams in subsequent time slots that is different from the set of third directive transmit beams.

According to a further aspect there is provided a (second) communication device, e.g. a station, for RF-based communication with another communication device, said communication device comprising:
  antenna circuitry configured to transmit and receive RF signals, and
  beamforming circuitry configured to perform beamforming and to control the antenna circuitry to transmit data using at least one first directive transmit beam while the other communication device is listening subsequently using different first directive receive beams, wherein data is only transmitted in one or more selected time slots, in which the other communication device is listening with a selected first directive receive beam, wherein the one or more time slots are selected based on information received from the other communication device or derived from third directive transmit beams used by the other communication device to transmit data in a beacon transmission phase prior to the beamforming training phase.

According to still further aspects corresponding communication methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed methods, the disclosed computer program and the disclosed computer-readable recording medium have similar and/or identical further embodiments as the claimed devices and as defined in the dependent claims and/or disclosed herein.

One of the aspects of the disclosure is to provide association beamforming training, which applies directive beams on at least the second communication device (AP), preferably on both communication devices (AP and STA). This yields an increase in link budget during the association phase, which can be exploited to extend association range, i.e. long range association beamforming training. Thus, first communication devices being far away from the second communication device can discover and join the basic service set (BSS) of that second communication device. Further, it is proposed to modify channel access during the association beamforming training if reciprocity can be assumed. This reduces the collision probability between first communication devices by exploiting their inherent spatial beam separation.

Further, a protocol and a signaling solution are disclosed to reduce the training time and at the same time allow for improved coverage and reduced collision probability. With the disclosed approach the receive beams utilized by the AP in the directive association phase are neither restricted to be the same, nor are they restricted to be in the same order as the transmit beams utilized in the preceding beacon training interval. Furthermore, embodiments of the disclosed solutions enable the AP to listen with variable beam widths during the association interval, whereby the beam widths may be chosen to cover one or more of the narrow beams, which have been previously used in transmit sector sweeps of a beacon interval. Reductions in overhead and training time may thus be achieved as compared to state of the art methods.

In the following, the terminology of WLAN systems is used, i.e. there is a station (STA) as an example of a first communication device and a single central network access point (AP) or personal basic service set control point (PCP) (generally referred to as AP herein; WLAN terminology sometimes uses the abbreviation PCP/AP) as an example of a second communication device, wherein the first and second communication devices may also be called transmitter and receiver. Both communication devices intend to exchange data wirelessly in the 60 GHz (mmWave) frequency band. However, this invention is applicable to any other RF communication system employing beamforming such as mmWave LTE The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 1 shows a schematic diagram of a communication system including first and second communication devices;

FIG. 8 shows a diagram of a Beacon Interval Control Field;

FIG. 9 shows a diagram of beacon frame body structure;

FIG. 10 shows a diagram of a simple association beamforming control field;

FIG. 11 shows a diagram of an advanced association beamforming control field;

FIG. 13 shows a diagram of an embodiment of association beamforming training according to another aspect;

FIG. 14 shows a diagram of an embodiment of an SSW field;

FIG. 15 shows a diagram of a first embodiment of a PPDU and frame structure and corresponding AWV configurations;

FIG. 16 shows a diagram of a second embodiment of a PPDU and frame structure and corresponding AWV configurations;

FIG. 19 shows a diagram of an embodiment of an extended scheduling element;

DETAILED DESCRIPTION OF THE EMBODIMENTS

Figure 2:
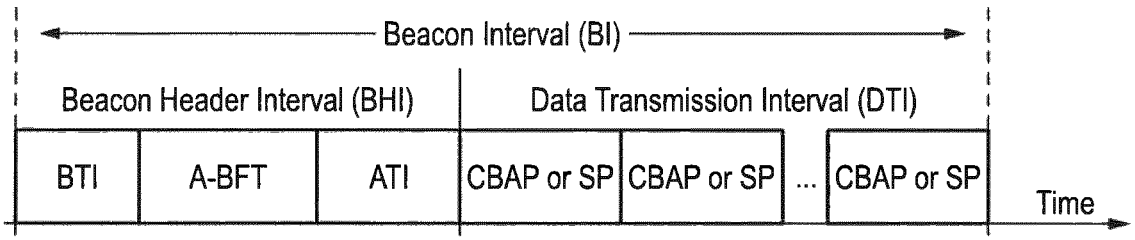
FIG. 2 shows a diagram of a transmission interval as described in IEEE802.11ad.

Referring now to the drawings, wherein like reference numerals designate identical or corresponding parts throughout the several views, FIGS. 1-11 illustrate communication devices and method according to a first aspect of the present disclosure and FIGS. 12-18 illustrate communication devices and methods according to a second aspect of the present disclosure.

FIG. 1 shows a schematic diagram of a communication system including first communication devices 1, 3 (stations STA1, STA2) and a second communication device 2 (an access point AP). Each of the first communication devices 1, 3 comprises an antenna circuitry (sometimes also called antenna unit) 10, 30 configured to transmit and receive RF signals, and a beamforming circuitry (sometimes also called beamforming unit) 11, 31 configured to perform beamforming and to control its antenna circuitry 10, 30. Similarly, the second communication devices 2 comprises an antenna circuitry 20 configured to transmit and receive RF signals, and a beamforming circuitry 21 configured to perform beamforming and to control its antenna circuitry 20. More details of their operation will be described below.

Communication systems in the 60 GHz frequency range suffer from strong free space path loss $a_{fs}$ which increases with frequency:

$$a_{fs} \text{ [dB]} = -147.55 \text{ dB} + 20 \log_{10} f + 20 \log_{10} d$$

This formula above gives the free space path loss in dB as a function of frequency f and link distance d. Apparently, a 60 GHz communication system has roughly 22 dB higher attenuation compared to a communication system operating at 5 GHz.

To overcome the increased path loss, 60 GHz or any mmWave communication system employs beamforming, i.e. transmitter and/or receiver feature an antenna circuitry, e.g. a steerable phased-array antenna (PAA), which can form directive beams towards the another communication device. Such beams have typically a high directivity and are spatially very narrow. The directivity in main direction increases with the number of antenna elements per PAA. In contrast, the half-power beam width (HPBW) defines the spatial width of a pattern decreases with increasing number of antennas. Thus, the more antennas per PAA, the higher the directivity and the smaller the HPBW. In order to make use of the PAA directivity for communications, beam alignment is crucial and of high importance for mmWave communication systems.

In the following description of exemplary embodiments, the terminology of WLAN system will be used, i.e. there is a station (STA) and a single central network access point (AP) or personal basic service set control point (PCP), i.e. the term AP as used herein shall be understood generally to reference either an AP or a PCP (also referenced as PCT/AP sometimes in WLAN terminology). Both intend to exchange data wirelessly in e.g. the 60 GHz (mmWave) frequency band. However, this disclosure is not limited to this frequency band, but is applicable to any other communication system employing beamforming such as mmWave LTE for example.

This disclosure particularly addresses the association phase (also called beamforming training phase or association beamforming training phase) during which STAs discover and associate to an AP. This phase is in particular challenging since initial beam alignment needs to be performed.

FIG. 2 shows a diagram of a transmission interval as described in IEEE802.11ad. The beacon interval (BI) is continuously repeated and the beacon header interval (BHI) holds all phases with respect to association. The actual data transfer occurs in data transmission interval (DTI). Since it is desired to keep DTI long compared to the BHI, the association beamforming training (A-BFT) phase and the announcement transmission interval (ATI) in BHI can be occasionally turned off, which is indicated in beacon frames sent during BTI.

Generally, according to IEEE802.11ad during a beacon transmission interval (BTI), the AP transmits identification data over various directive beams which have their main directivity in different spatial directions. An STA listens to the medium, e.g. with an (quasi) omni-directional (also called "quasi-omni" hereinafter) or wide beam antenna, i.e. no directive pattern is applied. Once a STA receives the AP identification data, it remembers the sector ID which has been applied for this message. Furthermore, it (e.g. randomly) chooses a time slot to transmit in the opposite direction (STA→AP) during association beamforming training (A-BFT) phase which follows subsequently to the BTI.

In A-BFT, the STA transmits data with various directive beams to the AP, which listens with an (quasi) omni-directional antenna. The STA transmit data holds the best sector ID of the previous BTI. When the STA stops transmitting and the AP successfully received at least one message, the AP confirms reception including the STA sector which was received in best quality (e.g. highest SNR). This message is transmitted via the beam corresponding to the best sector ID indicated in previous A-BFT phase. The actual association procedure takes place in the following announcement transmission interval (ATI). In the ATI, the best beams indicated by best sector IDs of BTI and A-BFT are employed.

Figure 3:
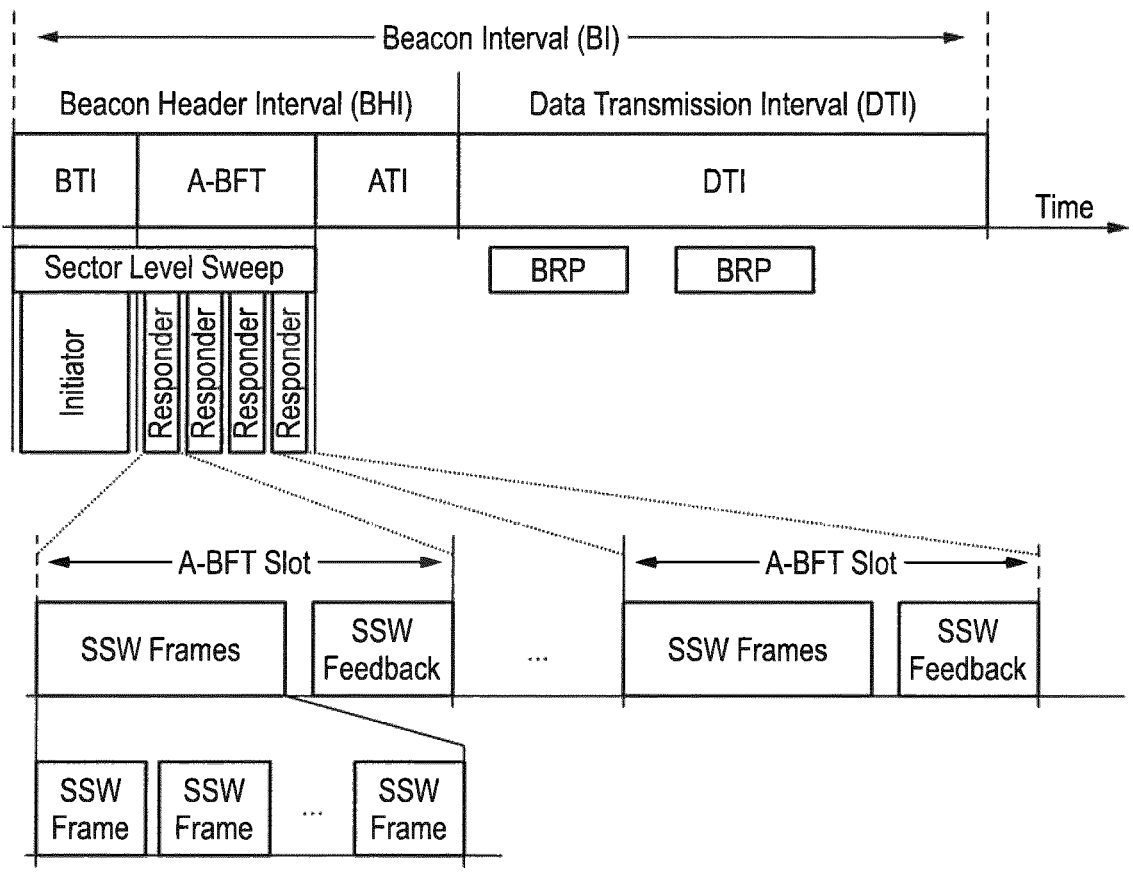
FIG. 3 shows a diagram of conventional association beamforming training.

In A-BFT, several STAs can compete for channel access. Therefore, the A-BFT is split in several slots as depicted in FIG. 3, which shows a diagram of conventional association beamforming training. Here, the A-BFT is exemplarily split in 4 slots where STAs can respond. STAs which would like to associate with the AP choose randomly a single slot. This reduces the likelihood of a collision. In case a collision happens, the AP is able to detect and it avoids sending the SSW feedback frame which is a reception confirmation. In case the SSW feedback is sent, it holds information about the best transmit sector ID of the STA. STAs not receiving the SSW feedback choose randomly a further A-BFT slot which could be even in an upcoming BI. The actual sweep of different antenna sectors within a single A-BFT slot is done in the SSW frames. Each SSW frame is transmitted with a distinct antenna sector which has a sector ID label indicated within the same SSW frame.

The above described operation has the drawback that association happens in directive-to-omni (D2O) mode which allows for less antenna gain compared to a directive-to-directive (D2D) mode. Hence, according to the present disclosure an association phase employing D2D yielding higher antenna gain in association phase is employed, thus increasing the AP coverage and enabling long range association and data transmission. Furthermore, double directive beamforming allows for spatial reuse during the association phase which can be exploited to reduce collision probability among STAs during association phase.

Figure 4:
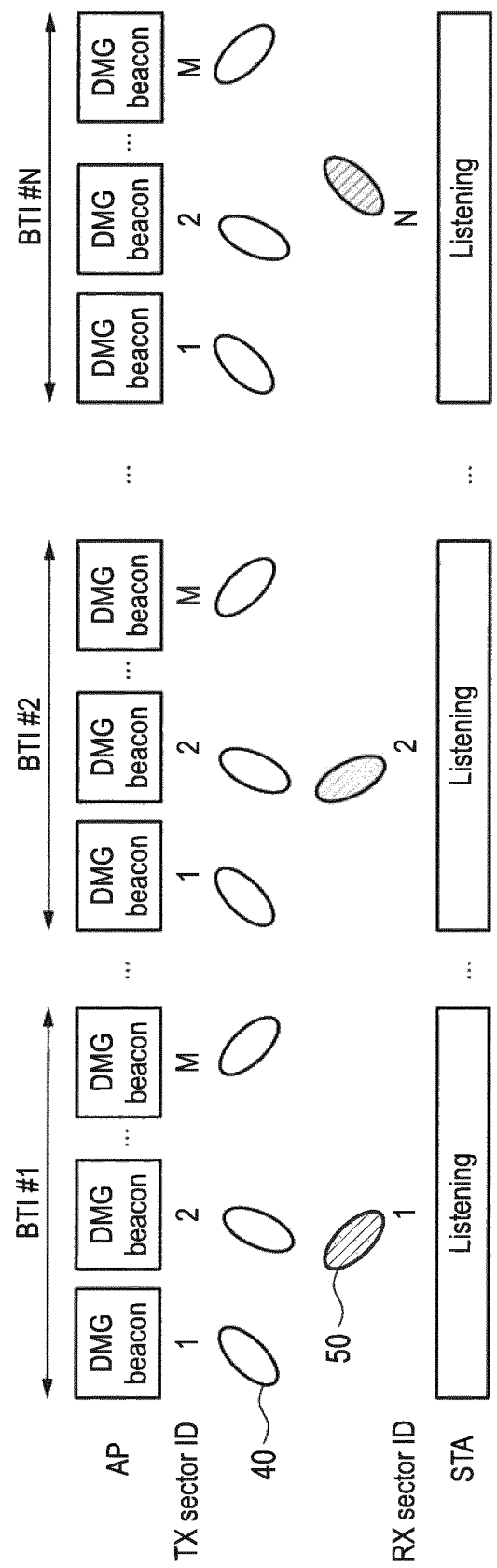
FIG. 4 shows a diagram of a beacon transmission interval.

FIG. 4 depicts a diagram of several beacon transmission intervals (BTI) according to an aspect of this disclosure, i.e. shows the AP TX and STA RX training procedure (also called beacon transmission phase) assuming that the STA has N different receive patterns which it intends to train. Each DMG (directional multi-gigabit) beacon frame that is transmitted in a BTI uses a dedicated direction or sector (i.e. a dedicated transmit beam, also referred to as "third directive transmit beam" herein), which is signaled within the DMG beacon. Thus, a STA receiving a DMG beacon can retrieve the TX sector ID the AP used to transmit this particular beacon.

The first step of the operation in the BTI described above may remain unchanged at the AP side, i.e. the AP transmits identification data via various directive beams 40 ("third directive transmit beams"). In contrast to the known operation as described above, a STA listens with various directive receive beams 50 ("third directive receive beams"). Since the STA is not aligned to the frame structure at this point, a STA may apply its directive receive beam 50 for the duration of at least one beacon interval (BI). During the BI, the receive pattern shall be unchanged. The IEEE802.11ad standard defines the maximum duration of a BI up to 1000 ms, typical values are in the range of 100 ms. A STA listens continuously to the channel and applies thereby its directive receive patterns successively. After all directive receive patterns have been applied, either an AP has been detected (case A) or no AP has been detected (case B).

In case A, the STA intends to communicate in a double directive A-BFT (DD-A-BFT) phase and the STA saves the best AP transmit sector (e.g. as "second transmit beam information", also referred to as $TX_{AP}$) and best STA receive sector (e.g. as "second receive beam information", also referred to as $RX_{STA}$) The best sector can be determined by evaluating SNR, SINR, or link capacity for example.

A STA should only consider communicating within a DD-A-BFT under specific conditions: e.g., if (i) the received SNR with sectors $TX_{AP}$ and $RX_{STA}$ is below a threshold, or (ii) the data reception in previous BTI was not successful with a quasi-omni pattern, or (iii) the number of FailedRS-SAttempts (number of unsuccessful association attempts) in regular A-BFT with quasi-omni pattern is above a threshold, or (iv) too many collisions arise in regular A-BFT triggering the need for spatial reuse in association phase. If the SNR is above this threshold, a STA shall consider a regular A-BFT. The threshold value in dB may be defined by $$\gamma_{target}+D_{STA,RX}+D_{AP,TX}-D_{STA,TX}-D_{AP,RX}$$

Thereby, $\gamma_{target}$ denotes the target SNR of the Control PHY MCS in dB, which is the most robust modulation coding scheme (MCS) and which is applied in beamforming training. Furthermore, DD denotes the beam directivity in dB of either STA or AP in either TX or RX mode, respectively.

In case B, no AP has been detected and the STA may repeat the listing procedure with various directive beams continuously or at a later point in time.

It should be noted that the AP may perform no special operations during this training phase. The modifications are mainly on STA side. Therefore, this approach can reuse any BTI such as described in IEEE802.11ad and/or IEEE802.11ay BTI. No dedicated double directive or long range BTI is required. Given that spatial reuse is the main objective of a STA, it may receive with an omni-directional pattern during a single BTI phase like it is done according to IEEE802.11ad. Prerequisite is that the link budget is sufficient to overcome path loss.

In a second phase (also called association beamforming training phase), the STA TX and AP RX procedure takes place in various DD-A-BFT slots. During a single DD-A-BFT slot, the STA uses different transmit sectors, one for each SSW frame. The AP keeps its receiver pattern unchanged during an entire DD-A-BFT slot, i.e. each SSW frame transmitted by the STA within one DD-A-BFT slot shall be received by the AP with the same receive beam or RX sector, respectively. Each DD-A-BFT slot uses different AP receiver patterns. In contrast to known procedures, a STA transmits SSW frames in all DD-A-BFT slots in order to cover all possible beam combinations.

In case of reciprocity, the channel, the applied beams, and the antennas are independent and invariant with respect to the communication direction, i.e. TX and RX beams have same properties and are similar in point of main lobe directivity and HPBW; location of side lobes is not important as long as the side lobe attenuation is large enough). Channel reciprocity is a prerequisite for having beam and/or antenna reciprocity which is an implementation property. For this reason, beam and/or antenna reciprocity can be either on STA and/or AP side or it is not available at all, i.e. this property is device specific. In order to keep the notation simple, the term reciprocity is used in the following. In case of single antenna systems, reciprocity includes channel and beam reciprocity. In case of multi-antenna systems antenna reciprocity is an additional prerequisite.

Figure 5:
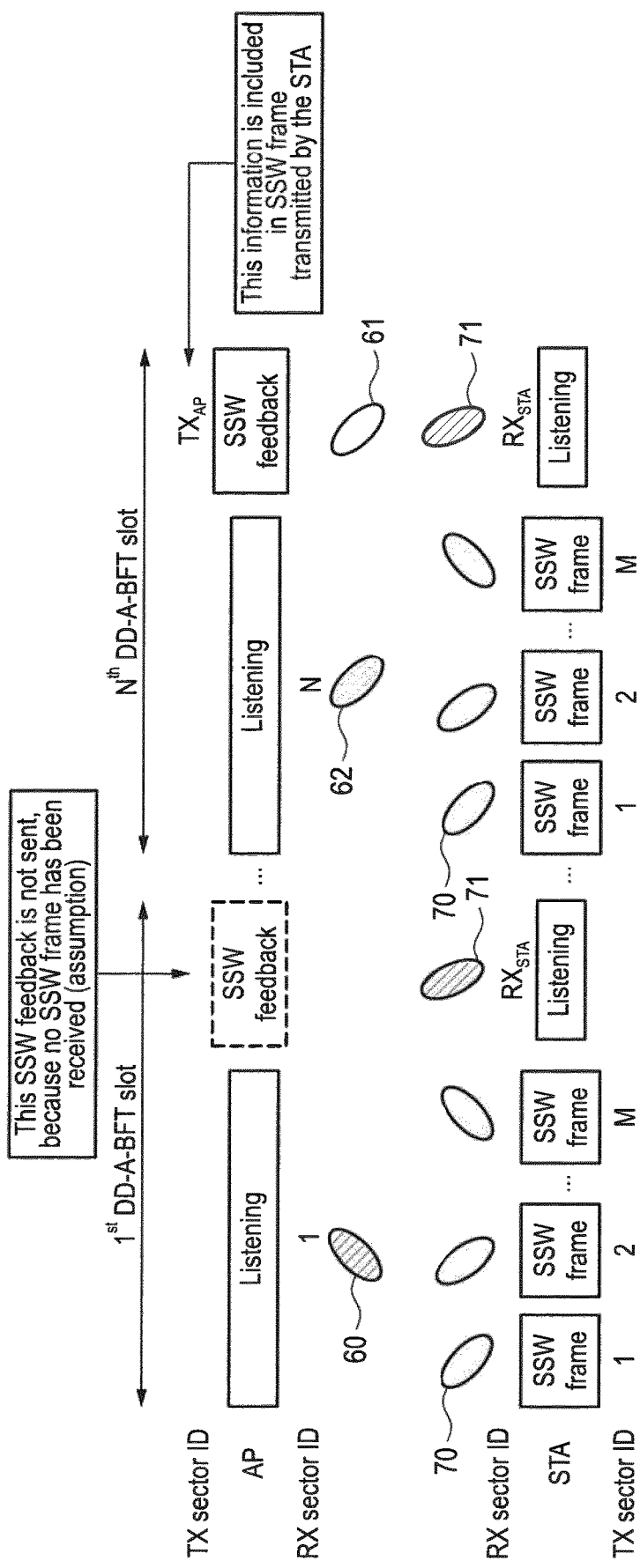
FIG. 5 shows a diagram of a first embodiment of association beamforming training with a single STA.

First, the case shall be considered where reciprocity is available neither at AP nor at STA side. FIG. 5 shows a diagram of a first embodiment of association beamforming training with a single STA. In each of the DD-A-BFT slots, the AP listens with a directive beam 60, 62, respectively ("first directive receive beam"). Each DD-A-BFT slot may have a different beam 60, 62 (it may be beneficial to use same receive beam in various DD-A-BFT slots, as will be explained later).

The STA is transmitting several SSW frames within one or more A-BFT slots, starting from the first A-BFT slot of the DD-A-BFT. In each DD-A-BFT slot, a STA can sweep through M different transmit patterns, i.e. use different directive beams 70 ("first directive transmit beams"). Thereby each SSW frame holds information about the best received AP transmit sector ($TX_{AP}$, "second transmit beam information") determined in the BTI phase (see FIG. 4) and the current transmit sector of the STA. In order to receive the SSW feedback ("response"), a STA uses its best RX beam 71 as indicated by $RX_{STA}$ ("second receive beam information") determined earlier in the BTI phase.

The number of slots N and the number M of SSW frames per slot may be signaled in the beacon interval control field (see below) and determined by the AP. In case a STA supports less than M transmit sectors, it shall stop transmission within the current slot after having completed all its transmit patterns and continue in the next DD-A-BFT slot if necessary. In case a STA supports more than M transmit sectors, it shall transmit only M selected sectors within a slot. The selection procedure is STA specific and may comprise an angular interpolation between available sectors.

In terms of the SSW feedback, the following rules are preferably applied in an embodiment:

1. If the AP was able to decode a SSW frame sent by a STA, it transmits a SSW feedback ("response"), preferably with TX sector information data contained in the SSW frame ($TX_{STA}$, "first transmit beam information") and using a directive transmit beam 61 indicated by $TX_{AP}$ ("second transmit beam information").

2. A SSW feedback is not sent if there has been no decodable SSW frame or if several STAs have been received simultaneously (collision). A collision is defined as a SSW frame received from at least two STAs simultaneously. More than one valid SSW frame reception from more than one STAs within a DD-A-BFT slot is not considered to be a collision but as feedback congestion. It shall be noted that some standards define a collision as two STAs using the same A-BFT slot even though the STAs access different SSW frames.

3. In case more than one SSW frames from more than one different STAs have been received during a DD-A-BFT slot (feedback congestion), the SSW feedback is addressed to the strongest STA. Pending SSW feedbacks may be addressed in future DD-A-BFT slots within same DD-A-BFT. In this case the same rule of sending the SSW feedback to the strongest STA applies. At the end of a DD-A-BFT phase, all pending SSW feedbacks shall be neglected.

4. In case a STA received a SSW feedback, it stops transmitting in further DD-A-BFT slots within the current BTI. This is to ensure that DD-A-BFT slots can be used for further stations to associate.

5. In case a STA received no feedback it schedules transmission in a further DD-A-BFT slot but keeps listening to the channel during all SSW feedback phases of same DD-A-BFT phase. This is to ensure that a STA can receive a SSW feedback frame at a later point in time in case of feedback congestion.

In FIG. 5 it is assumed that the AP receives a valid SSW frame in the $N^{th}$ DD-A-BFT slot. Therefore, there is only one SSW feedback sent at the end of the $N^{th}$ DD-A-BFT slot.

In contrast to known operations, where STAs choose randomly a single A-BFT slot for doing their sector sweep (in case a STA cannot finish its sector sweep, it may continue in the next slot), STAs transmit in some embodiments from the beginning of the first DD-A-BFT slot. The likelihood of a collision is reduced by the fact that the AP uses directive receive beams, instead of an omni-directional pattern. A collision arises if within one SSW frame interval of one DD-A-BFT slot signals from two or more STAs have been received with similar power. Since the AP applies directive receive patterns, collision probability is lower compared to quasi-omni reception.

The above rule 3 applies, if the AP received more than one valid SSW frame from more than one STA. Because two frames have not been received at the same time, it is not a collision. At this point, the AP should send two SSW feedbacks which may be not possible (as in IEEE 802.11ad specification) leading to feedback congestion which reeds to be resolved. Therefore, the AP transmits to the STA received strongest (in terms of SNR, SINR, or capacity for example) and the AP uses one of the upcoming SSW feedback opportunities to address the weak STA. Alternatively, frame structures to allow for simultaneous feedback to multiple STAs can be envisioned. In this case, the SSW feedback may be sent simultaneously to all or a set of the STAs that were received within the same DD-A-BFT slot.

Figure 6:
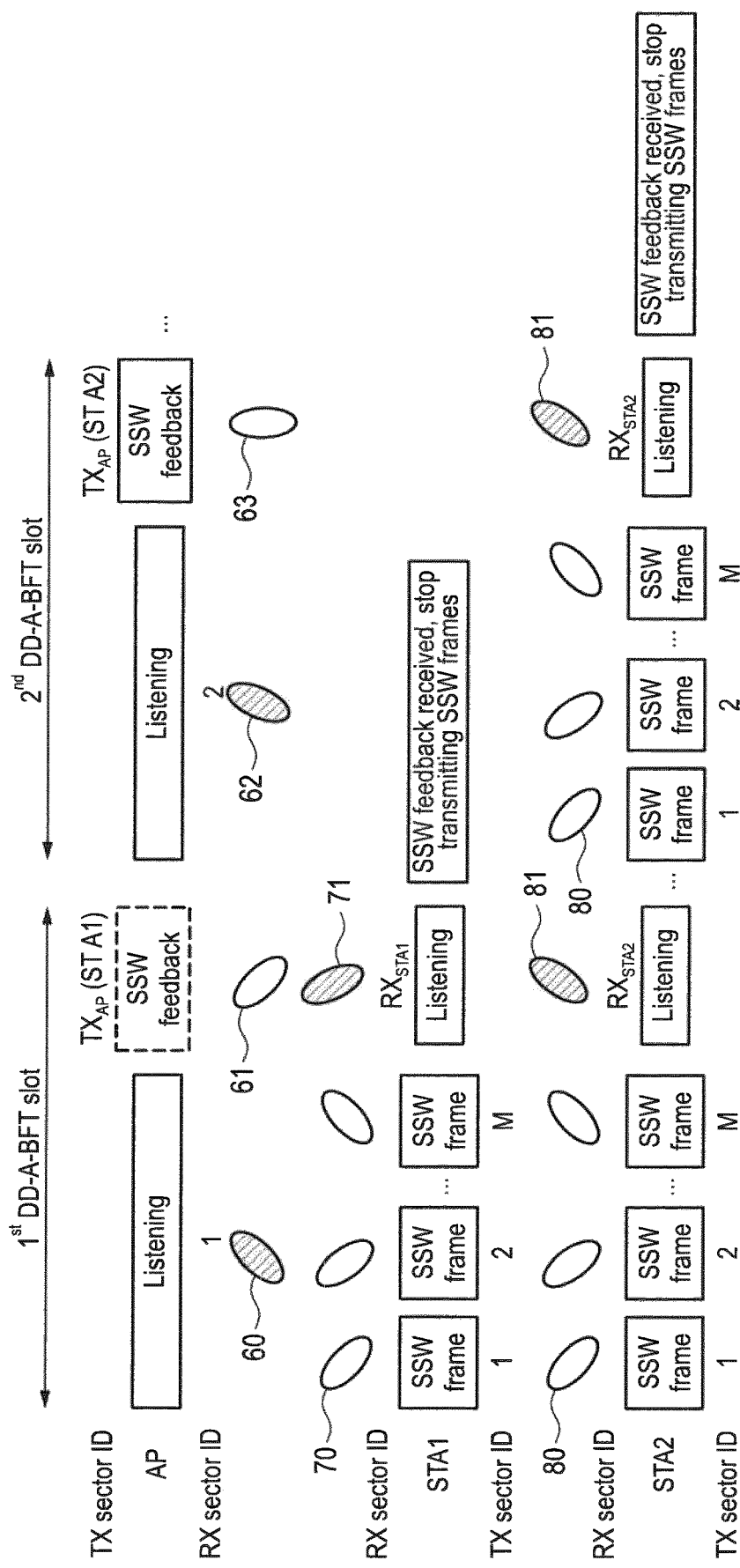
FIG. 6 shows a diagram of a second embodiment of association beamforming training with a two STAs.

FIG. 6 shows a diagram of a second embodiment of association beamforming training with a two STAs associating simultaneously. It is assumed that STA 1 and STA 2 have been able to associate in the first and second DD-A-BFT slot, respectively. If a SSW feedback has been received, both AP and STAs have knowledge of the best TX and RX sector ID to use for subsequent communications. Note that only TX sector information is required to be exchanged between AP and STA during SSW frames and SSW feedback, respectively.

In the example shown in FIG. 6, in a first sector sweep STA1 uses first directive transmit beams 70, STA2 uses first directive transmit beams 80 and AP listens using a first directive receive beam 60. Preferably, in the first directive transmit beams 70 and 80 the information about the best third transmit beam used by the AP in the beacon transmission interval for the respective STA (i.e. $TX_{AP}$(STA1) and $TX_{AP}$(STA2), "second transmit beam information") is included.

If during the first sweep the AP received a valid SSW frame only from STA1, it sends a SSW feedback ("response") that is addressed to STA1 using a second directive transmit beam 61 indicated by the second transmit beam information $TX_{AP}$(STA1) from STA1. Simultaneously, STA1 and STA2 listen with the respective second directive receive beam 71, 81 indicated by the second receive beam information $RX_{STA1}$ and $RX_{STA2}$. Since the SSW feedback is addressed to STA1, e.g. by including a corresponding identifier such as MAC address, AID (association identifier), or pre-AID, STA1 now knows its best sector (i.e. its best directive transmit beam) to use for subsequent communication since this information is included in the SSW feedback transmitted with 61. STA1 can now stop transmitting SSW frames in subsequent slots.

Subsequently, in a second sector sweep, STA2 uses first directive transmit beams 80 AP listens using a first directive receive beam 62. If the AP received a valid SSW frame from STA2 it sends a SSW feedback ("response") that is addressed to STA2 and uses a second directive transmit beam 63 indicated by the second transmit beam information $TX_{AP}$(STA2) from STA2. Simultaneously, STA2 listens with the respective second directive receive beam 81 indicated by the second receive beam information $RX_{STA2}$. Since the SSW feedback is addressed to STA2, e.g. by including a corresponding identifier, STA2 now knows its best sector (i.e. its best directive transmit beam) to use for subsequent communication since this information is included in the SSW feedback 63. STA2 can now stop transmitting SSW frames in subsequent slots.

Figure 7:
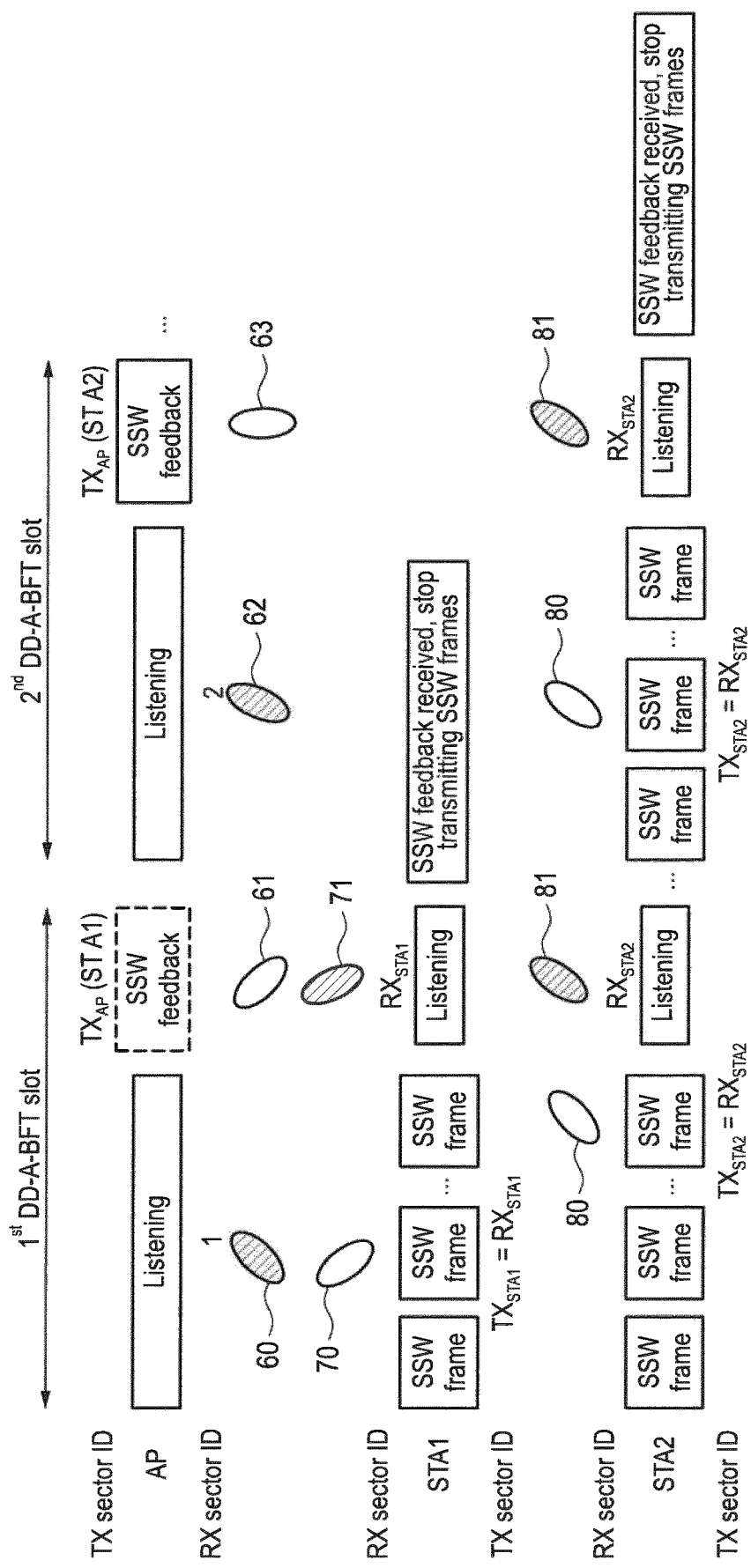
FIG. 7 shows a diagram of a third embodiment of association beamforming training with a two STAs employing reciprocity.

FIG. 7 shows a diagram of a third embodiment of association beamforming training with two STAs employing reciprocity. In this case, a STA has already the information about its best TX beam namely the best RX beam, i.e. $TX_{STA}=RX_{STA}$ (equal sign should be interpreted as described above). In this case, a STA transmits randomly only one SSW frame within each DD-A-BFT slot using $TX_{STA}=RX_{STA}$. This is to vacate the DD-A-BFT slots for other STAs competing for association in the same BI. FIG. 7 shows the basic procedure for two STAs (no collision or feedback congestion assumed). Dashed SSW frames indicate frames that are not transmitted but are virtual placeholders (SSW frame transmit opportunities).

Furthermore, if it is known by the STA when the AP uses a particular received pattern and if the AP features reciprocity, it transmits only one SSW frame in each DD-A-BFT slot where the AP receives with the desired receive beam. Since the STA knows best $TX_{AP}$ sector, it is also aware of the best $RX_{AP}$ sector ($TX_{AP}=RX_{AP}$). If the sweep sequence of TX and RX beams is equal, the STA can predict, when the AP applies the appropriate receive pattern in DD-A-BFT. Alternatively, the Rx sectors, which the AP is going to use in DD-A-BFT, can be signaled within the DMG beacon. In this case, a single STA can occupy randomly even only one SSW slot within all DD-A-BFT slots during a BI. However, for more robustness, a single STA can occupy several SSW slots in order to train more (e.g. neighboring) RX sectors at AP and/or it can use more SSW frames within a slot in order to train more of its own TX sectors (e.g. TX sectors that are neighbors of the RX sectors on which the highest SNR was received during the AP SSW in BTI).

If the AP features reciprocity but the STA does not, a STA transmits only in that single slot where the AP applies the appropriate receive sector, i.e. $RX_{AP}=TX_{AP}$. This requires the STA to be aware in which slot the AP applies a dedicated receive sector.

It should be noted that all four variants—no reciprocity, STA reciprocity, AP reciprocity, AP and STA reciprocity—can be applied independently and simultaneously. There is no requirement that all associating STAs have same properties or access rules.

In current IEEE 802.11ad specification, an AP supports only a round-trip-time delay of 1 μs, which corresponds to a maximum range of 150 m. It is proposed to change this value to multiples of 1 μs using e.g. the "Coverage Class field" as defined in the IEEE 802.11 standard. At the moment this field is not applicable for mmWave communication.

All variable parameters may be signaled in the Beacon Interval Control field shown in FIG. 8, which is part of DMG beacon frame body. For example: A-BFT length field indicates the number of A-BFT slots (1 up to 8); FSS indicates the number of SSW frame slots within one A-BFT slot (1 up to 16); Next A-BFT field indicates the number of BI during which the A-BFT is not present; N BIs A-BFT field indicates the interval, in number of beacon intervals, at which the AP allocates an A-BFT. All other fields are described the IEEE 802.11 standard.

For DD-A-BFT, the minimal change required is an indication if the upcoming A-BFT is a DD-A-BFT. It is proposed to use a single bit of the reserved bits (B44 to B47 in FIG. 8) to indicate a DD-A-BFT.

A further option to signal a DD-A-BFT is to add a further control field in the DMG beacon frame body shown in FIG. 9. The DMG beacon frame body can hold several partly optional signaling fields and therefore its length is variable. Thus, several options to signal a DD-A-BFT can be possibly implemented:

Introduction of a simple DD-A-BFT control field with the structure show in FIG. 10.

DD-A-BFT length field indicates the number of DD-A-BFT slots (1 up to 8).

FSS field indicates the number of SSW frame slots within one DD-A-BFT slot (1 up to 16).

Next DD-A-BFT field indicates the number of BI during which the DD-A-BFT is not present.

DD-A-BFT count field indicates the number of DD-A-BFTs since the STA sending the DMG Beacon frame last switched RX DMG antennas for a DD-A-BFT. A value of 0 indicates that the DMG antenna used in the forthcoming DD-A-BFT differs from the DMG antenna used in the last DD-A-BFT.

N-DD-A-BFT in Ant field indicates how many A-BFTs the STA sending the DMG Beacon frame receives from each DMG antenna.

Introduction of an advanced DD-A-BFT control field (see FIG. 11), which enables the AP to use several DD-A-BFT phases to train all receive sectors in case number of beams to be tested is larger than the number of DD-A-BFT slots as signaled in DD-A-BFT length field. This is indicated by 'fragmented DD-A-BFT bit. The number of required DD-A-BFT slots is indicated by 'DD-A-BFT span'.

If it is assumed that there is a total of N non-overlapping receive patterns, each receive pattern can contribute a gain of roughly $10 \log_{10} N$ dB of link budget which results in $\sqrt{N}$ fold link distance according to the free space path loss formula for example.

Further if N different non-overlapping receive patterns are assumed, collision probability of STAs joining at same time can be reduced by factor N, if STAs are assumed to be equally spatially distributed.

FIGS. 12-18 illustrate communication devices and methods according to a second aspect of the present disclosure.

If STAs need to sweep the receive beams through each of sector sweep (SSW) slots with L RX beams (L being number of possible beams), this can be a very large overhead, since all TX/RX combinations of directive beams may have to be tested. If e.g. the AP listens directionally with all the beams which it has received during an initiator transmit sector sweep (I-TXSS) phase, a large number of slots are necessary (currently a maximum of L=64 sweeps per antenna array are defined).

Thus, according to the second aspect, the set of first receive beams utilized by the AP for listening in the beamforming training phase differs from the set of third transmit beams utilized by the AP for transmitting in the beacon transmission phase in number (only a subset may be necessary) and/or widths (larger beam widths may be used by the AP on receive) and/or angular sectors (the angular sectors can be a combination of sectors previously used for transmission in the beacon transmission phase).

The association beamforming training presented according to the second aspect can be performed during similar A_BFT slots, as the DD-A-BFT as described above or it can be alternatively performed in scheduled association beamforming service periods. A preferred embodiment implies performing the beamforming training in both DD-A-BFT and scheduled intervals to allow more flexibility and robustness, as will be described further in this disclosure.

Figure 12:
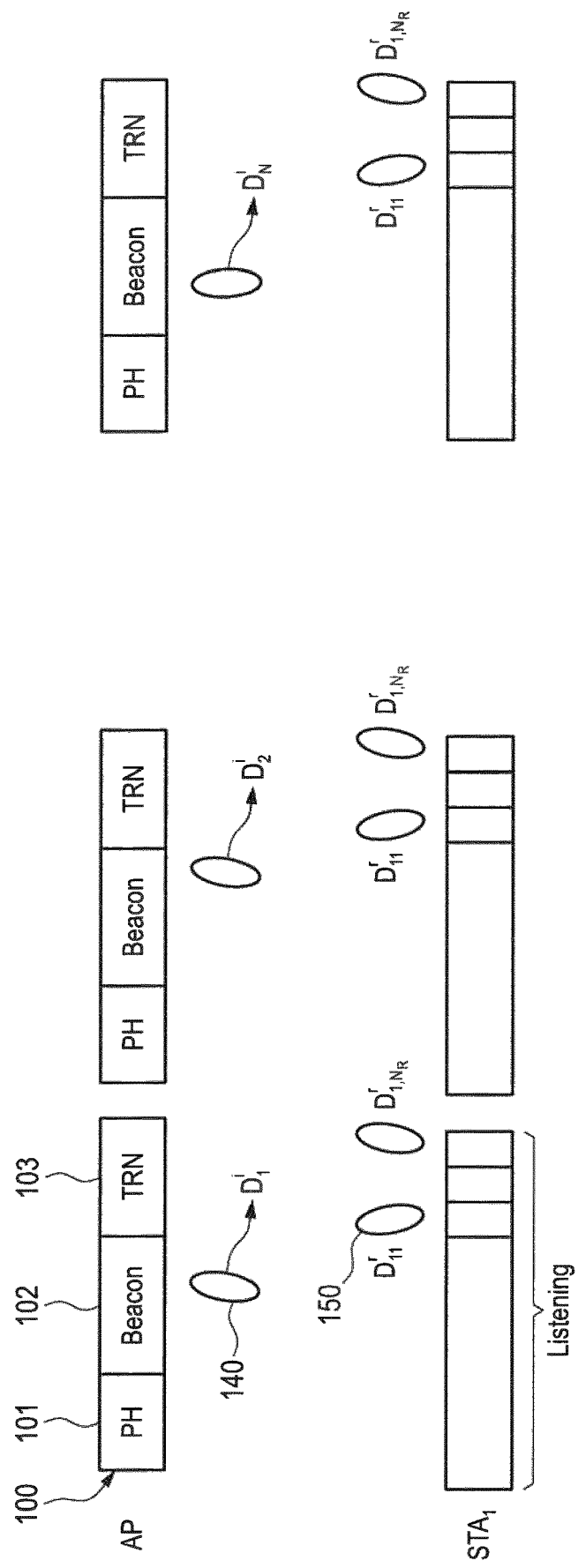
FIG. 12 shows a diagram of an embodiment of a beacon transmission phase according to another aspect.

FIG. 12 shows a diagram of an embodiment of a beacon transmission phase according to the second aspect. Similar to the above described solutions, the AP sends beacon frames 102 with directive beams 140 ("third directive transmit beams"). In addition to what was previously described, each beacon frame 102 is embedded in a PPDU (physical protocol data unit) which has appended $N_r$ training units (TRNs), i.e. in the embodiment shown in FIG. 12 a beacon PPDU 100 comprises preamble and header fields (PH) 101, a beacon frame 102 and one or more (generally $N_r$) training units 103. The STAs (only one is shown in FIG. 12) estimate link quality (e.g. by evaluating the received power) on one or more $N_r$ receive beams 150 ("third receive beams") for each of the transmit beams 150 that contain TRN fields, and based on this information they estimate the best wide beam on which they can transmit in a subsequent beamforming training phase.

According to the second aspect, in the association beamforming training phase, as e.g. shown in FIG. 13 for an embodiment, the AP may use for some of the sectors wide beams 160 ("first receive beams") corresponding to several of the narrow beams 140 that have been previously swept in the beamforming transmission phase. More precisely, each angular sector on which the AP receives during the association phase may comprise one or a union of the angular sectors covered by narrow beams 140 in the beamforming phase. To benefit from this, it is preferred for the STAs to have some information about the correspondence between these narrow transmit beams 140 used in the beacon transmission phase by the AP for transmission and the wide receive beams 160 used in the beamforming training phase by the AP for listening. Several options are possible:

According to one option information about the correspondence between the narrow transmit beams 140 and the wide receive beams 160 is contained in the beacon 100. More clearly, in addition to the sector index corresponding to the directive transmit beam 140 (e.g., $D_1^i$) with which the frame is currently sent, each beacon frame 102 may contain the index of the wide receive beam 160 to which the directive transmit beam 140 corresponds (e.g., $W_1^i$ where $D_1^i \in W_1^i$). If the directive association can contain multiple sub-stages, in which different beam widths can be used then each beacon frame 102 may contain all the wide receive beams 160 to which the narrow transmit beam 140 corresponds (e.g., $W_{1,1}^i, \ldots W_{S,1}^i$, where $D_1^i \in W_{S,1}^i \in \ldots \in W_{1,1}^i$).

The STA estimates the third receive beam 150, which is the most appropriate (e.g., receives the strongest power) for the directive transmit beam 140, on which the beacon 100 was sent. If the narrow transmit beam 140 corresponds to only one wide sector, 160, as given by the correspondence information, then in the association beamforming training phase the STA will send with a first transmit beam 170, in the time slot in which the AP "listens" with this wide sector (i.e. with the wide first receive beam 160).

With respect to where this wide-narrow beam correspondence information can be included, two options are preferred: i) it can be in the (sector sweep) SSW field, by reusing the RXSS bits which are reserved during the beacon intervals, as shown in FIG. 14 or ii) it can be included in an information element of the beacon frame, e.g., in an extended schedule.

With respect to the third transmit beams 140 being used during each of the beacons 100, according to one option the same directive transmit beam 140 may be used during the TRNs as has been used for the rest of the PPDU, as shown in FIG. 15 illustrating a diagram of a first embodiment of a PPDU and frame structure and corresponding AWV configurations. Each STA finds the best third transmit beam $D_t^i$ and third receive beam 150 $D_{1,j}^r$ which maximize the received power and will send in the association beamforming training phase with a transmit beam covering the same angular sector as $D_{1,j}^r$, in the time interval allocated to AP reception with $W_1^i \ni D_1^i$.

Alternatively, the AP may send during the beacon transmission phase in the training intervals with a wide beam, with which it will receive in the beamforming training phase, e.g., with $W_1^i$ such that $W_1^i \ni D_1^i$. To achieve this, one option is to allow the AP to change the AWV from directive $D_1^i$ to wide $W_1^i \ni D_1^i$, whereas the wide pattern $W_1^i$ is only used for the transmission of the TRN sequences. This allows the STAs to better estimate the first transmit beams 170, which they may use in the association beamforming training phase to be best received by the AP. This is shown in FIG. 16 illustrating a diagram of a second embodiment of a PPDU and frame structure and corresponding AWV configurations.

Figure 17:
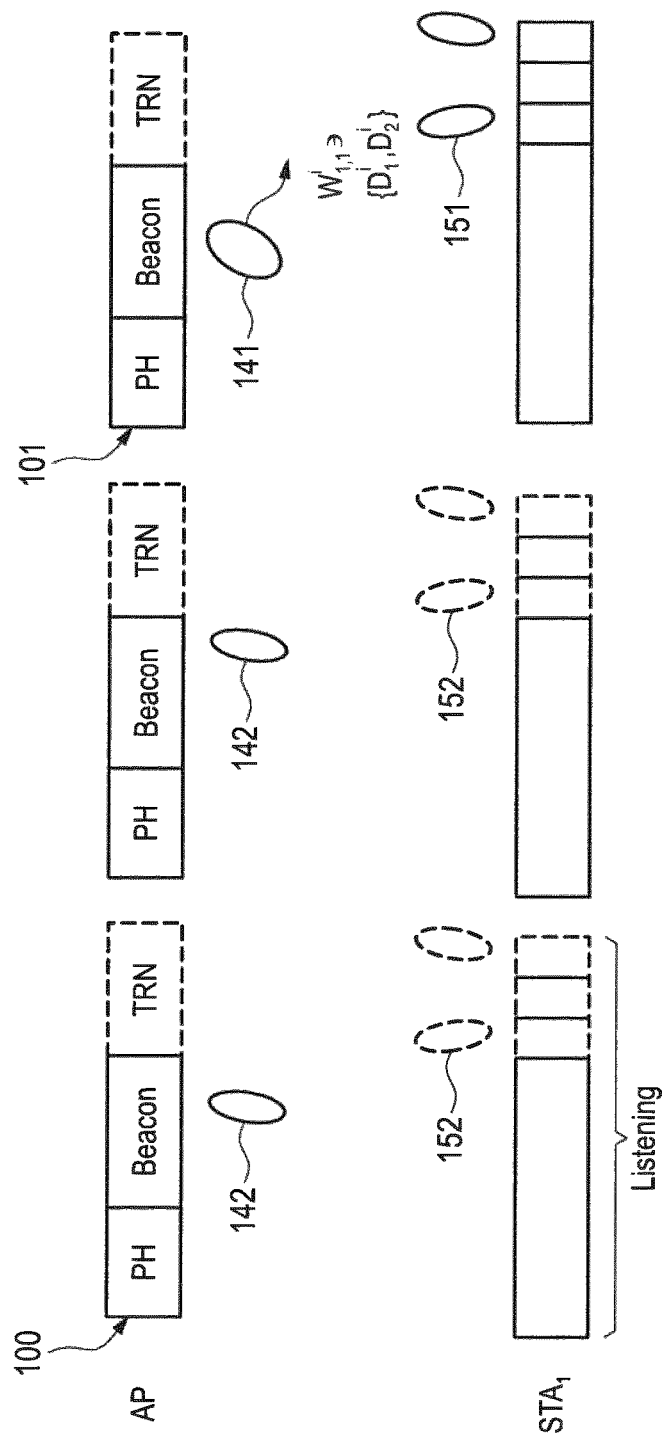
FIG. 17 shows a diagram of another embodiment of a beacon transmission phase.

According to another option, a the AP may be allowed to transmit wide beams 141 on beacons intertwined with the narrow beams 142 and then have the STAs infer the information about the narrow-wide correspondence from the behavior of the AP. This is shown in FIG. 17 illustrating a diagram of another embodiment of a beacon transmission phase. According to this embodiment the AP sends after a certain number of narrow sweeps (i.e. with narrow third directive transmit beams 142) one frame 101 with the wide transmit beam 141 which will be 'approximately' used in the beamforming training phase as first wide receive beam 160 (see FIG. 13). Contrary to the above described embodiment, the STAs only need to perform receive beam training during the time intervals corresponding to the transmission with the wide beams, so that the training overhead can be reduced, as training sequences do not need to be appended to all the beacons, in particular the ones sent with narrow beams. This is indicated in FIG. 17 by the dashed lines for the TRN fields, third receive beams 152 (which are optional) contrary to the mandatory TRN fields and third receive beams 151, respectively that are used for training and are marked with solid lines. Furthermore, these third wide transmit beams 141 may have extra training fields corresponding to narrow third transmit beams 142 previously trained, therefore allowing the STAs to gain information on the narrow-wide correspondence without additional signaling fields. For this option, the Beacon element may still contain the scheduling information i.e., the wide beam indexes, in the order in which these will be used.

Figure 18:
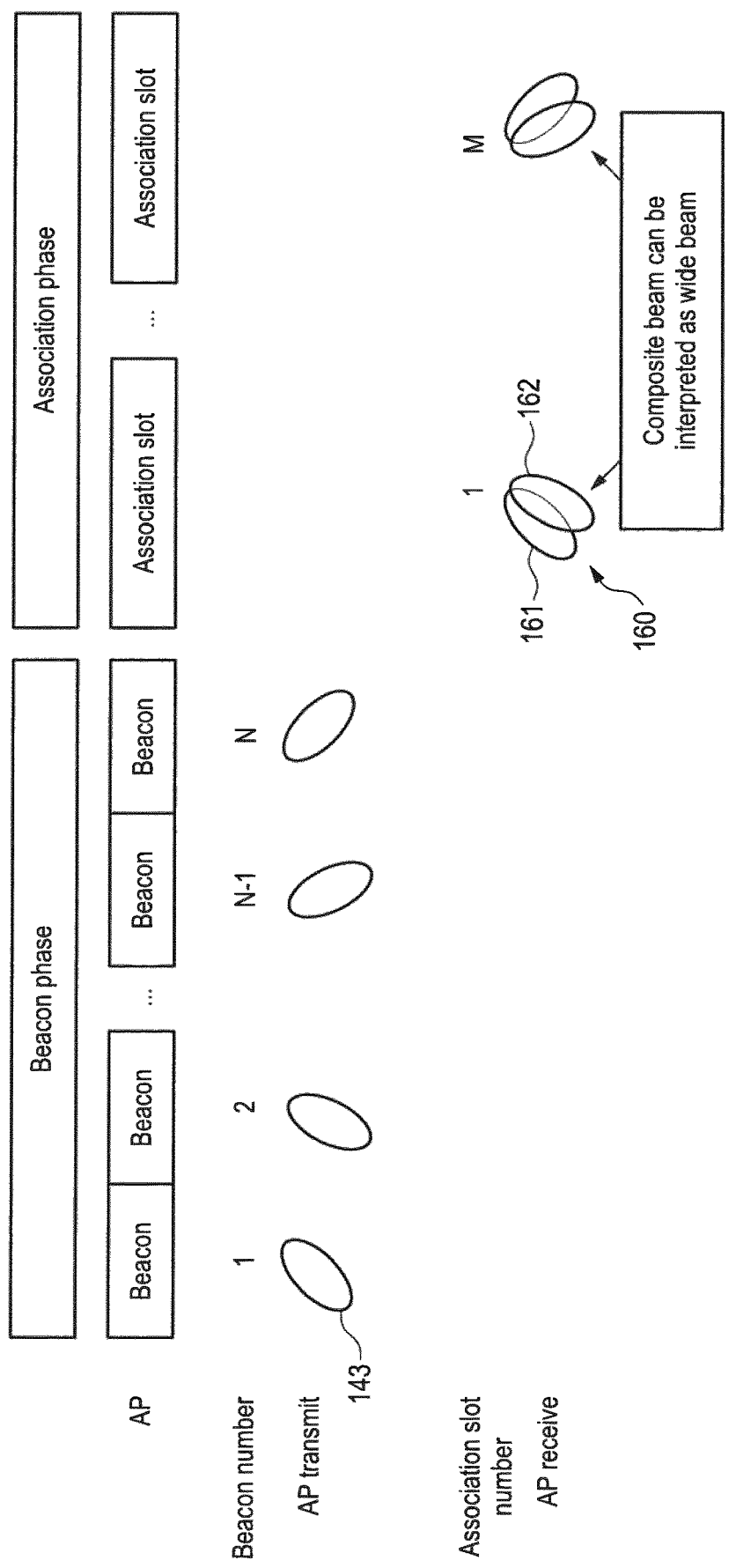
FIG. 18 shows a diagram of still another embodiment of a beacon transmission phase and a beamforming transmission phase.

A further option considers implicit signaling depicted in FIG. 18 illustrating a diagram of still another embodiment of a beacon transmission phase and a beamforming transmission phase. According to this embodiment each beacon holds information about the length of the further stage or association phase (i.e. the beamforming training phase). This information about the length can be given in absolute manner i.e., in number of slots M defined by the AP for association or relative to the number of beacons N sent in the previous training (i.e. the beacon transmission phase) e.g., as an integer c=N/M. If there are N beacon frames transmitted each with a particular narrow beam 143, i.e. N narrow third transmit beams, then the AP sets M to an integer fractional of N, (i.e. M·c=N with c being an integer with c≥1) and the AP listens with a wide first receive beam 160 which combines c narrow beams 161, 162. Thereby, the order of the beam sweep is kept unchanged with respect to the beacon transmission phase. For illustration it may be assumed that N=4 and M=2 as well as beam indices n=1 . . . N and m=1 . . . M for beacon transmission phase and association phase (beamforming training phase), respectively. An AP using implicit signaling would use for the first slot (m=1) a wide beam comprising beam n=1 and n=2 of beacon transmission phase, whereas in the second slot (m=2) the AP uses a wide beam combining beam n=3 and n=4. Since N and M are known by the STA from the beacon data c can be readily computed. Also a STA can determine the actual n in the beacon transmission phase where it receives the beacon with best quality and by knowing c it can compute the value of m and determine when to transmit in the beamforming training phase. In the special case of c=1, the beams and their sequence are equal in the beacon transmission phase and the beamforming training phase.

A further option to allow directive association beamforming training with variable beam width, during A-BFT slots, is based on the concept of using a multiplier. This concept allows an increased number of A-BFT slots to be used by enhanced DMG (EDMG) stations. The number of additional slots is the value indicated in the A-BFT Length field multiplied with the value in the Multiplier field, both defined in the EDMG beacon. Further, to allow only the EDMG STAs to access these slots the Duration field can be modified such that the DMG STAs "see" the beginning of the A-BFT at a later time, i.e., after the enhanced A-BFT slots, therefore do not attempt access during modified association phase which they do not fully exploit. For directional association only the additional A-BFT slots may be used, wherein the value of the multiplier can define "implicitly" the value of the beam width e.g., for a multiplier value of 2 the width of the angular sector is half of the width of an angular sector for multiplier 1.

In this case, within a beacon sent with a directive beam Di, the part of the RXSS Length field of the SSW field, which is currently reserved, can be used to indicate the index of the A-BFT slot that the AP uses for an angular sector corresponding to the directive beam Di with which the respective frame is transmitted. Also, since this index only requires a limited number of bits, an additional field within the RXSS field may be used to indicate that the immediately following A-BFT is directive and the following bits should be used for the directive A-BFT slot indication.

The disclosed signaling of wide beams and/or integration of wide beams within the transmit sector sweeps makes it possible to have a fully flexible directive association phase. The AP may choose according to the link conditions which sectors require a larger or finer resolution for directive association and adapt the training phases to these conditions. For example if collisions were detected within one sector or if within one sector signals were detected but could not be properly decoded, the directive association can be repeated using narrower receive beams. In this case the information about the receive beams may only be attached to narrow beams corresponding to these sectors.

The disclosed directive association phase may comprise one or more sub-stages. In the first sub-stage the STAs send one or more directive beams, from the best ones that they have trained during the beacon transmission phase, while the AP receives directionally with beams, which may differ in pattern to the narrow transmit beams used in the previous I-TXSS phase, which however correspond to the scheduling announced. In the example shown in FIG. 13, the AP uses wide transmit beams 160 $W_1^i$, where each wide beam 150 covers an angular sector similar to the combination of the angular sectors covered by the combination of the third receive sectors $D_1^i$ and $D_2^i$ used in the beamforming transmission phase (see FIG. 12).

An optional feedback stage may be beneficial inside this period. In this case, after each stage of wide beam width reception, the AP sends back a feedback message 104 to the STAs from which it has received a message to prevent them from reattempting association and interfering others. After the feedback stage, the training may resume with an additional sub-stage, in which the third receive beams 160 are narrower than in the previous sub-stage, or more time slots are allowed. A mandatory feedback stage should be present after the last such sub-stage to allow the AP to send to all STAs whose frames it has decoded an acknowledgment 103 that association was successful. Should optional feedback be allowed, then the beacon should include as an extended schedule the sequence of beams that it uses and indicate that a feedback stage is present.

For transmitting feedback to one particular STA in the (optional or mandatory) feedback stage a second transmit beam 163 is used by the AP, which may optionally correspond to the third transmit beam 140 selected by the STA as best third transmit beam in the beacon transmission phase. Alternatively, the AP may aggregate multiple feedbacks to multiple STAs within one wide sector, in which case this will transmit the feedback with the wide beam covering the angular sectors corresponding to the best third transmit beams received by the receptive STAs. Yet another option, in the case when multiple STAs have been received during an association slot with wide beam, is to allow the AP to schedule multiple time slots in which it sends the feedback individually to each of these STAs, with the narrow third transmit beam, reported by each of these STAs. During the feedback stages the STAs listen using a second receive beam 171, 181, which may correspond to the best third receive beam selected by the respective STA in the beacon transmission phase.

As simple signaling option is to have indicate in the extended schedule, in which allocations the STAs should expect the feedback information, whereas the wide-narrow indication corresponding to each sub-stage can be included in a beacon element. A different possibility is that several service periods can be scheduled i.e., each sub-stage as described above corresponds to one separate training period.

The optional feedback may be useful also in the case when the AP listens sequentially with various antennas. This is because there may be cases in which a STA hears the signal from multiple antennas, thus may reattempt transmission on the best sector of a different antenna, should it have not received any feedback/acknowledgement from the previous antenna.

According to a further embodiment modifications may be made to the STA behavior. For instance, in long range or blockage scenarios the STAs may not be able to hear the beacons omni-directionally and therefore may not manage to figure out that TRNs are attached to certain frames to allow receive beam training. In such cases, these STAs may listen with some wide receive beams over one or more beacon intervals and may possibly reduce the beam width e.g., once signals are detected in a sector, beams can be narrowed to allow for packet detection and further narrowed during the TRN fields to allow for the best estimation of beams to be used for the transmission in the association phase. For such long range cases, to compensate for the low link budget in uplink, during the association several time slots can be randomly chosen, in which the STAs may sweep narrow beams within the receive sector, estimated during the transmit sector. For such cases STAs may feedback a long range flag, to let the AP know that only double directive transmissions are possible and adapt various procedures that generally require omni-directional transmission in one side (e.g., RTS/CTS). Whenever multiple allocations for the same receive beams are allocated, the STAs may transmit with several narrow beams from the sector which was considered the best for reception.

According to a further embodiment modifications may be made to the scheduling element. The scheduling element can be within beacon frames, thus sent during the beacon interval or it can be within announce frames, thus sent during association time intervals. The second option allows the AP to decide upon the receive beams to be used in an additional scheduled directive association phase, based on the outcome of a regular A. BFT or a directive DD-A-BFT. The advantage of the latter option is larger flexibility at the AP, which may allow e.g., only several problematic sectors to be tested, where e.g., collisions were detected. A scheduling element within each beacon frame or within each announce frame may contain allocation information for all the sub-stages of the directive association described above. Two types of allocation may exist: a first one to specify the allocation intervals in which the AP listens directively while STAs are allowed to access the channel, and a second one of allocation intervals in which the STAs are in listening mode to receive acknowledgment from the AP, should the AP have heard them. Each of the former types of allocations may contain a beamforming control field, which specifies the index of the wide beam which is used in the specific allocation. This can be e.g. done by reusing the reserved bits within the current Beamforming Control field. Further, this field may contain a field indicating the number of SSW frames that may be used by a STA. Whenever the value inside this field is above 0, the STAs may sweep inside the best receive wide beam sector to increase the chances to be received by the AP. This information can be e.g. included in the Beamforming Control field by reusing the RXSS length field. The allocation type defining these allocation intervals may need to be newly defined to respect at the same time legacy and the new requirements, mentioned above, however this can be easily done as there exist reserved bits for the allocation type in current allocation field (sometimes also called AID field) structure definition. An example of a scheduling element is shown in FIG. 19. Here, the allocation fields are indicated as AID 1, AID 2, etc. since each allocation field is generally indicated by a corresponding allocation identifier (AID).

In an alternative embodiment each of the beacon frames or announce frames contains only scheduling information indicating the allocation intervals that are related to the directive third receive beam with which the respective beams have been received, i.e. if the beacon frame has been transmitted with directive beam $D_1^i$ the scheduling element will contain an allocation with a beamforming control information specifying the index of the wide beam $W_1^i$ such that $D_1^i \in W_1^i$ and an allocation for the feedback/ack. Optionally allocation fields for intervals where AP listens with narrower beam than $W_1^i$ but wider than $W_1^i$ may be specified.

According to a preferred embodiment, after the beacon transmission phase is performed as described above, a directive association beamforming training interval (D-ABFT) is allowed, in which the AP listens with coarse beams $W_1^i, \ldots, W_{N_s}^i$, wherein each $W_1^i$ corresponds to some of the directive sectors swept within the beacon transmission phase. Hereby, $N_S$ represents the number of A-BFT slots as specified by the beacon. As the succession of the first wide receive beams follows the same order as the third narrow transmit beams, there is one coarse beam per A-BFT slot and the coarse beam (first wide receive beam) covers the wide angular domain as the superposition of all narrow third transmit beams swept during the beacon transmission phase. The presence of the directive A-BFT can be indicated in beacons and may only be accessed by EDMG STAs. The mechanisms of the A-BFT are respected in the sense that STAs are allowed to access one or more of the wide beams, but only for the slots in which the receive beams employed at the AP correspond to the best received beam of the STA. If after the DD-A-BFT, collisions were detected in some of the sectors, the AP may send within the ATI a scheduling element as described, wherein allocation intervals are assigned for the problematic sectors i.e. with indications of the wide beams or possibly narrower beams within the wide beam.

Figures 20, 21:
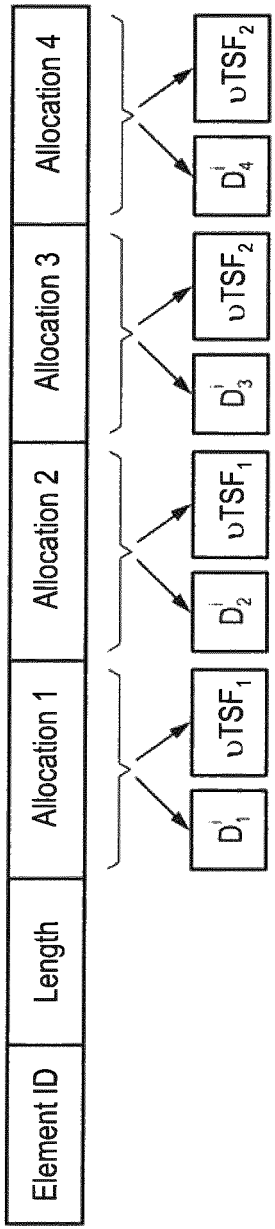
FIG. 20 shows a diagram of another embodiment of an extended scheduling element and FIG. 21 shows a diagram of an embodiment of an EDMG extended schedule element.

FIG. 20 shows a diagram of another embodiment of an extended scheduling element, wherein allocations are defined such as to allow the AP to receive simultaneously with more than one directive beam. Assuming one wide beam that is used for reception can be approximated by a superposition of several narrower beams, that have been used during the BTI beam sweep (i.e. in the beacon transmission phase), an easy way exists to signal with which variable beamwidth the AP listens during the association phase (i.e. the beamforming training phase). This can be basically done by scheduling allocations with multiple narrow beam reception having the same allocation time. Each allocation field thus indicates a directive beam D and its time of use vTSF. Here, TSF stands for the timing synchronization function and vTSF represents the lower 4 octets of the TSF at the time the SP (service period, i.e. the period of data transmission) starts. For example, the Allocation 1 indicates the time $vTSF_1$ when the first directive beam $D_1^i$ (which may e.g. be the beam 161 in FIG. 18) is used. Since the Allocation 2 field has the same start time $vTSF_1$ as Allocation 1, however a different directive beam $D_1^i$, this has a similar effect to receiving at the start time $vTSF_1$ with a wide beam $W_1^i$ covering a sector composed of the two sectors defined by $D_1^i$ and $D_2^i$.

The allocations are generally defined after the STAs are associated with an AP and therefore have already received an association ID. These association IDs are then utilized to indicate which STAs will transmit within a specific allocation. Two values may be used: A first value indicates broadcast (i.e., if source association ID=broadcast ID all STAs may transmit in the specific allocation, if destination association ID=broadcast ID, all STAs are in reception mode). A second value indicates AP (i.e., if source association ID=AP association ID, then the AP is the one transmitting in the respective association). Hence, the "allocations" shown in FIG. 20 may comprise two further entries representing these two values.

For the particular case of directive association during DTI, such association IDs are not yet available. Furthermore allowing the use of the broadcast association ID would confuse legacy STAs which may transmit within this particular allocation and thus interfere with the association. Therefore, in an embodiment a specific broadcast association ID is defined and reserved, which can be only understood by the EDMG STAs or the DMG STAs which are able to participate in this type of training.

The number of spatial allocations, i.e., number of time blocks in which an AP listens with a particular RX beam, can be defined within the allocation frame, e.g. by reusing the NBIks field, which indicates the number of the SSW frames (i.e. the number of available SSW transmit opportunities). The maximum number of space time slots (N_STS) in which a STA may transmit during an allocation i.e., the number of transmit beams that the STA may sweep, can be defined in the BF Control field of the DMG extended schedule element or in the EDMG extended schedule element of this allocation. In the first case either the RXSS Length may be reused, so that basically the STAs reinterpret this as N_STS, or reserved bits in this field may be used to encode N_STS. In the second case, several reserved bits of the EDMG extended schedule element can be used to encode N_STS.

FIG. 21 shows an exemplary modification of the EDMG extended schedule element. The Allocation Key comprises the number of NBIk, i.e. the number of available SSW frames and N_STS indicates how many SSW frames may be used. Two bits are designated to signal the maximum number of space time slots in which a STA can transmit. Either a linear or an exponential interpretation of this field may be applied as illustrated in the following table:

| N_STS value in field | Actual N_STS value (linear) | Actual N_STS value (exponential) |
| --- | --- | --- |
| 00 | 1 | 1 |
| 01 | 2 | 2 |
| 10 | 3 | 4 |
| 11 | 4 | 8 |

In still another embodiment an additional field (in the allocation fields shown in FIGS. 19 and 20) to signal the gain of the beams $D_j^r$ or $W_j^r$ or a function depending on the gain of the beams $D_j^r$ or $W_j^r$ may be provided, which can enable the STAs to compute if the link budget is enough for them to access the beamformed SP, in which the AP listens with the RX beam $D_j^r$ or $W_j^r$:

By use of communication devices and methods according to the present disclosure several advantages can be achieved. In particular: long range AP discovery for mmWave systems; increase of roughly 10 $\log_{10}$ M dB in link budget in association phase; improved channel access in case of reciprocity; and spatial reuse in association phase, i.e. spatial beam properties are exploited for association phase Further, according to the second aspect, the set of first receive beams utilized by the AP for listening in the beamforming training phase differs from the set of third transmit beams utilized by the AP for transmitting in the beacon transmission phase in number (only a subset may be necessary) and/or widths (larger beam widths may be used by the AP on receive) and/or angular sectors (the angular sectors can be a combination of sectors previously used for transmission in the beacon transmission phase).

Using beams with variable beam widths during the beacon transmission phase and the association phase, as described above for the second aspect, can reduce the association time and/or the total beam training time, while keeping the advantages of the directive association solutions, in particular low collision and long range. Based on the method and signaling described for the second aspect a more flexible association phase is possible, which is adapted to specific scenarios (e.g., collisions happening preponderantly in some angular sectors).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A communication device (2) for RF-based communication with another communication device (1), said communication device comprising:
   antenna circuitry configured to transmit and receive RF signals, and
   beamforming circuitry configured to perform beamforming and to control the antenna circuitry to transmit data, in a beacon transmission phase prior to the beamforming training phase, using a set of third directive transmit beams in subsequent time slots and to listen, in the beamforming training phase, using a set of first directive receive beams in subsequent time slots that is different from the set of third directive transmit beams.

2. The communication device as defined in any preceding embodiment,
   wherein the beamforming circuitry is configured to control the antenna circuitry to listen using different first directive receive beams in subsequent time slots, wherein one or more of the first directive beams have a larger beam width and/or are covering different angular sectors and/or are only a subset of the third directive transmit beams used in the beacon transmission phase for transmitting data.

3. The communication device as defined in embodiment 2,
   wherein the beamforming circuitry is configured to control the antenna circuitry to adapt the beam width and/or the angular sectors and/or the number of the first directive receive beams used in subsequent time slots.

4. The communication device as defined in any preceding embodiment,
   wherein the beamforming circuitry is configured to control the antenna circuitry to transmit scheduling information in the beacon transmission phase, said scheduling information indicating in which time slot which first directive receive beam will be used by the communication device for listening in the beamforming training phase and/or indicating if the communication device is transmitting in a certain time slot and/or which other communication device is allowed to transmit in a certain time slot.

5. The communication device as defined in any preceding embodiment,
   wherein the beamforming circuitry is configured to control the antenna circuitry to transmit correspondence information in the beacon transmission phase, said correspondence information indicating the correspondence between a third transmit beam used by the communication device in the beacon transmission phase for transmitting data in a particular time slot and a first receive beam used by the communication device in the beamforming training phase for listening in a particular time slot.

6. The communication device as defined in any preceding embodiment,
   wherein the beamforming circuitry is configured to control the antenna circuitry to select a sequence of narrow and wide third transmit beams used for transmitting data in the beacon transmission phase allowing the other communication device to determine in which time slot to transmit data with a selected first transmit beam.

7. The communication device as defined in any preceding embodiment,
   wherein the beamforming circuitry is configured to control the antenna circuitry to transmit data in the beacon transmission phase in data units, a data unit comprising a beacon frame and one or more training units, wherein a beacon frame of a data unit is transmitted using a narrower third transmit beam than the one or more training units of the data unit.

8. A communication method for RF-based communication with another communication device, said communication method controlling an antenna circuitry to perform beamforming and to transmit data, in a beacon transmission phase prior to the beamforming training phase, using a set of third directive transmit beams in subsequent time slots and to listen, in the beamforming training phase, using a set of first directive receive beams in subsequent time slots that is different from the set of third directive transmit beams.

9. A communication device (1) for RF-based communication with another communication device (2), said communication device comprising:
   antenna circuitry configured to transmit and receive RF signals, and
   beamforming circuitry configured to perform beamforming and to control the antenna circuitry to transmit data using at least one first directive transmit beam while the other communication device is listening subsequently using different first directive receive beams, wherein data is only transmitted in one or more selected time slots, in which the other communication device is listening with a selected first directive receive beam, wherein the one or more time slots are selected based on information received from the other communication device or derived from third directive transmit beams used by the other communication device to transmit data in a beacon transmission phase prior to the beamforming training phase.

10. The communication device as defined in embodiment 9,
wherein the beamforming circuitry is configured to control the antenna circuitry to carry out, in the beacon transmission phase, the steps of
a) listening using different third directive receive beams in at least part of a time slot while the other communication device transmits data using a third directive transmit beam, wherein the other communication device transmits data using different third directive transmit beams in subsequent time slots, and
b) selecting one or more third directive receive beams for use in determining the first directive transmit beams to be used in the subsequent beamforming training phase.

11. The communication device as defined in embodiment 9, wherein the beamforming circuitry is configured to control the antenna circuitry to carry out, in the beacon transmission phase, the steps of
a) listening using a quasi-omnidirectional receive beam in at least part of a time slot while the other communication device transmits data using a third directive transmit beam, wherein the other communication device transmits data using different third directive transmit beams in subsequent time slots, and
b) selecting one or more third directive transmit beams for use in determining in which one or more time slots to transmit data in the beamforming training phase by determining when the other communication device listens with a first directive receive beam corresponding to or covering a selected third directive transmit beam.

12. The communication device as defined in embodiment 9,
wherein the beamforming circuitry is configured to control the antenna circuitry to select the one or more time slots in which it transmits data in the beamforming training phase based on scheduling information received from the other communication device in a beacon transmission phase prior to the beamforming training phase, said scheduling information indicating in which time slot which first directive receive beam will be used by the other communication device for listening in the beamforming training phase and/or indicating if the other communication device is transmitting in a certain time slot and/or if the communication device is allowed to transmit in a certain time slot.

13. The communication device as defined in embodiment 9,
wherein the beamforming circuitry is configured to control the antenna circuitry to select the one or more time slots in which it transmits data in the beamforming training phase based on correspondence information received from the other communication device in a beacon transmission phase prior to the beamforming training phase, said correspondence information indicating the correspondence between a third transmit beam used by the other communication device in the beacon transmission phase for transmitting data in a particular time slot and a first receive beam to be used by the other communication device in the beamforming training phase for listening in a particular time slot.

14. The communication device as defined in embodiment 12 and/or 13,
wherein the beamforming circuitry is configured to derive the scheduling information and/or the correspondence information from an SSW field or a beamforming control field or an information field of a beacon frame transmitted by the other communication device in the beacon transmission phase.

15. The communication device as defined in embodiment 9,
wherein the beamforming circuitry is configured to control the antenna circuitry to select the one or more time slots in which it transmits data in the beamforming training phase based on the sequence in which the other communication device transmits data with different third transmit beams in a beacon transmission phase prior to the beamforming training phase, wherein two or more third transmit beams covered by a single first receive beam that will be used by the other communication device in the beamforming training phase are followed or preceded by a third transmit beam corresponding to said first receive beam.

16. The communication device as defined in embodiment 9,
wherein the beamforming circuitry is configured to control the antenna circuitry to select the one or more time slots in which it transmits data in the beamforming training phase based on the sequence in which the other communication device transmits data with different third transmit beams in the beacon transmission phase, wherein a predetermined number of subsequently used third transmit beams will be covered by a first receive beam and/or wherein the sequence of first receive beams corresponds to the sequence of third transmit beams.

17. The communication device as defined in embodiment 9,
wherein the beamforming circuitry is configured to control the antenna circuitry to listen, after one or more time slots of transmitting data or in specially allocated feedback intervals, using a second receive beam for a response from the other communication device, which is configured to transmit, if the data transmitted by the communication device have been received, a response using a second directive transmit beam.

18. The communication device as defined in embodiment 17,
wherein the beamforming circuitry is configured to control the antenna circuitry to include a second transmit beam information in the data transmitted using at least one first directive transmit beam for use by the other communication device for transmitting the response by a second directive transmit beam indicated by the second transmit beam information.

19. A communication method for RF-based communication with another communication device, said communication method controlling an antenna circuitry to perform beamforming and in a beamforming training phase to transmit data using at least one first directive transmit beam while the other communication device is listening subsequently using different first directive receive beams, wherein data is only transmitted in one or more selected time slots, in which the other communication device is listening with a selected first directive receive beam, wherein the one or more time slots are selected based on information received from the other communication device or derived from third directive transmit beams used by the other communication device to transmit data in a beacon transmission phase prior to the beamforming training phase.

20. A non-transitory computer-readable recording medium that stores therein a computer program product, which, when executed by a processor, causes the method according to embodiment 8 or 19 to be performed.

21. A computer program comprising program code means for causing a computer to perform the steps of said method according to embodiment 8 or 19 when said computer program is carried out on a computer.

A1. A communication device (1) for RF-based communication with another communication device (2), said communication device (1) comprising:
- an antenna circuitry (10) configured to transmit and receive RF signals, and
- a beamforming circuitry (11) configured to perform beamforming and to control the antenna circuitry in a beamforming training phase to transmit and/or receive RF signals using one or more selected directive beams, wherein the beamforming circuitry (11) is configured to perform beamforming training by controlling the antenna circuitry
  i) to transmit data using at least one first directive transmit beam, wherein the other communication device (2) is configured to listen using a first directive receive beam, said data including a second transmit beam information,
  ii) to subsequently listen using a predetermined second directive receive beam for a response from the other communication device (2), which is configured to transmit, if the data transmitted in step i) have been received, a response using a second directive transmit beam indicated by the second transmit beam information, and
  iii) to repeat steps i) and ii) if no response is received in step ii).

A2. The communication device as defined in embodiment A1, wherein the beamforming circuitry (11) is configured to control the antenna circuitry to successively transmit the data in step i) with a number of different first directive transmit beams.

A3. The communication device as defined in embodiment A2,
wherein the beamforming circuitry (11) is configured to control the antenna circuitry to transmit a predefined number of first directive beams as signaled by the other communication device in a previous training phase or a beacon transmission phase.

A4. The communication device as defined in embodiment A2 or A3,
wherein the beamforming circuitry (11) is configured to obtain from the response received in step ii) a first transmit beam information indicating at least one of the first directive transmit beams by which the data, which have been received by the second communication device (2), have been transmitted by the communication device (1).

A5. The communication device as defined in any one of the preceding embodiments A,
wherein the beamforming circuitry (11) is configured to control the antenna circuitry to transmit the data in step i) with a single first directive transmit beam.

A6. The communication device as defined in embodiment A5,
wherein the beamforming circuitry (11) is configured to control the antenna circuitry to transmit the data in step i) with the same or different single first directive transmit beams in subsequent iterations of step i).

A7. The communication device as defined in embodiment A5 or A6,
wherein the beamforming circuitry (11) is configured to control the antenna circuitry to use the same beam as first directive transmit beam and second directive receive beam.

A8. The communication device as defined in any one of the preceding embodiments A,
wherein the beamforming circuitry (11) is configured to decide in step ii) that a response has been received if it includes a first identifier of the communication device (1).

A9. The communication device as defined in any one of the preceding embodiments A,
wherein the beamforming circuitry (11) is configured to control the antenna circuitry to carry out, in a beacon transmission phase prior to the beamforming training phase, the steps of
a) listening using a third receive beam while the other communication device (2) transmits a second identifier of the other communication device (2) subsequently using different third directive transmit beams, and
b) setting, once the second identifier has been received, the third directive transmit beam used for transmitting the second identifier as second directive transmit beam indicated by the second transmit beam information.

A10. The communication device as defined in embodiment A9,
wherein the beamforming circuitry (11) is configured to control the antenna circuitry
  to listen, in step a), by successively using different third directive receive beams, while in each succession the other communication device (2) subsequently uses different third directive transmit beams and
  by setting, in step b), the third directive receive beam with which the second identifier has been received, as second directive receive beam.

A11. A communication method for RF-based communication with another communication device (2), said communication method controlling an antenna circuitry in a beamforming training phase to transmit and/or receive RF signals using one or more selected directive beams by
i) transmitting data using at least one first directive transmit beam, wherein the other communication device (2) is configured to listen using a first directive receive beam, said data including a second transmit beam information,
ii) subsequently listening using a predetermined second directive receive beam for a response from the other communication device (2), which is configured to transmit, if the data transmitted in step i) have been received, a response using a second directive transmit beam indicated by the second transmit beam information, and
iii) repeating steps i) and ii) if no response is received in step ii).

A12. A communication device (2) for RF-based communication with another communication device (1), said communication device (2) comprising:
- an antenna circuitry (20) configured to transmit and receive RF signals, and
- a beamforming circuitry (21) configured to perform beamforming and to control the antenna circuitry, in a beamforming training phase, to transmit and/or receive RF signals using one or more selected directive beams, wherein the beamforming circuitry (21) is configured to perform beamforming training by controlling the antenna circuitry
  i) to listen using a first directive receive beam for data transmitted by the other communication device (1) using at least one first directive transmit beam, said data including a second transmit beam information, ii) to subsequently transmit, if the data transmitted in step i) have been received, a response using a second directive transmit beam indicated by the second transmit beam information, wherein the other communication device (1) is configured to listen using a predetermined second directive receive beam, and iii) to repeat steps i) and ii) by using different first predetermined directive receive beams in step i).

A13. The communication device as defined in embodiment A12, wherein the beamforming circuitry (21) is configured to include in the response a first transmit beam information indicating the first directive transmit beam by which the data, which have been received by the communication device (2), have been transmitted by the other communication device (1).

A14. The communication device as defined in embodiment A12 or A13, wherein the beamforming circuitry (21) is configured to control the antenna circuitry to include in the response a first identifier of the other communication device (1) from which the data have been received.

A15. The communication device as defined in embodiment A14, wherein the beamforming circuitry (21) is configured to control the antenna circuitry to include in the response a first identifier of another communication device from which the data have been received with highest quality or SNR.

16. The communication device as defined in any one of the embodiments A12 to A15, wherein the beamforming circuitry (21) is configured to control the antenna circuitry to transmit a response only if data have been received in step i) with a quality or SNR above a predetermined threshold.

A17. The communication device as defined in any one of the embodiments A12 to A15, wherein the beamforming circuitry (21) is configured to control the antenna circuitry to perform beacon transmission, prior to beamforming training, by transmitting a second identifier of the second communication device (2) subsequently using different third directive transmit beams, while the other communication device (1) is configured to listen using a third receive beam.

A18. The communication device as defined in any one of the embodiments A12 to A15, wherein the beamforming circuitry (21) is configured to maintain an ordered list of other communication devices and their respective first transmit beam information from which data have successfully been received and/or wherein the beamforming circuitry (21) is configured to control the antenna circuitry to include in the response one identifier and first transmit beam information of the ordered list while removing this data from the ordered list.

A19. A communication method for RF-based communication with another communication device (1), said communication method controlling an antenna circuitry, in a beamforming training phase, to transmit and/or receive RF signals using one or more selected directive beams by i) listening using a first directive receive beam for data transmitted by the other communication device (1) using at least one first directive transmit beam, said data including a second transmit beam information, ii) subsequently transmitting, if the data transmitted in step i) have been received, a response using a second directive transmit beam indicated by the second transmit beam information, wherein the other communication device (1) is configured to listen using a predetermined second directive receive beam, and iii) repeating steps i) and ii) by using different first predetermined directive receive beams in step i).

A20. A non-transitory computer-readable recording medium that stores therein a computer program product, which, when executed by a processor, causes the method according to embodiment A11 or A19 to be performed.

A21. A computer program comprising program code means for causing a computer to perform the steps of said method according to embodiment A11 or A19 when said computer program is carried out on a computer.

The invention claimed is:

1. A communication device, comprising:
antenna circuitry configured to transmit and receive radio frequency (RF) signals with another communication device; and
beamforming circuitry configured to
perform beamforming;
control the antenna circuitry to transmit, in a beacon transmission phase prior to a beamforming training phase, scheduling information and data using a set of transmit beams in plural time slots; and
listen, in the beamforming training phase, using a particular receive beam of a set of receive beams in plural time slots, wherein
the set of receive beams, including the particular received beam, is different than the set of transmit beams in terms of one or more of beam width, angular sector, number, and order,
the scheduling information includes information identifying a time slot in which the particular receive beam will be used by the communication device for listening in the beamforming training phase,
the scheduling information indicates a number of time slots in which the communication device listens with the particular receive beam, and
the set of receive beams, including the particular receive beam, is derived from the set of transmit beams.

2. The communication device as claimed in claim 1, wherein
one or more of the receive beams of the set of receive beams:
has a larger beam width than another receive beam of the set of receive beams, and/or
covers different angular sectors than another receive beam of the set of receive beams, and/or
are only a subset of the transmit beams used in the beacon transmission phase for transmitting data.

3. The communication device as claimed in claim 2, wherein the beamforming circuitry is configured to control the antenna circuitry to adjust any of the beam width, the angular sectors, and a number of the receive beams used in the plural time slots.

4. The communication device as claimed in claim 1, wherein the scheduling information further indicates whether the communication device is transmitting in a certain time slot and/or which other communication device is allowed to transmit in the certain time slot.

5. The communication device as claimed in claim 1, wherein the beamforming circuitry is configured to control the antenna circuitry to transmit correspondence information in the beacon transmission phase, the correspondence information indicating a correspondence between a transmit beam used by the communication device in the beacon transmission phase for transmitting data in a particular time slot and a receive beam used by the communication device in the beamforming training phase for listening in a particular time slot.

6. The communication device as claimed in claim 1, wherein the beamforming circuitry is configured to control the antenna circuitry to select a sequence of narrow and wide transmit beams used for transmitting data in the beacon transmission phase allowing the other communication device to determine in which time slot to transmit data with a selected transmit beam.

7. The communication device as claimed in claim 1, wherein the beamforming circuitry is configured to control the antenna circuitry to transmit data in the beacon transmission phase in data units, with each respective data unit comprising a beacon frame and one or more training units, such that a beacon frame of a data unit is transmitted using a particular transmit beam having a narrower beam width than the one or more training units of the data unit.

8. The communication device as claimed in claim 1, wherein the particular receive beam is wider than each individual transmit beam of the set of transmit beams of the beacon transmission phase.

9. The communication device as claimed in claim 1, wherein the beamforming circuitry is configured to control the antenna circuitry to transmit, in the beacon transmission phase prior to the beamforming training phase, information about correspondence between the transmit beams of the set of transmit beams and at least the particular receive beam of the set of receive beams.

10. A communication method, comprising:
controlling an antenna circuitry of a communication device, that transmits and receives radio frequency (RF) signals with another communication device, to perform beamforming using beamforming circuitry;
controlling the antenna circuitry to transmit, in a beacon transmission phase prior to a beamforming training phase, scheduling information and data using a set of transmit beams in plural time slots; and
listening, in the beamforming training phase, using a particular receive beam of a set of receive beams in plural time slots, wherein
the set of receive beams, including the particular receive beam, is different than the set of transmit beams in terms of one or more of beam width, angular sector, number, and order,
the scheduling information includes information identifying a time slot in which the particular receive beam will be used by the communication device for listening in the beamforming training phase,
the scheduling information indicates a number of time slots in which the communication device listens with the particular receive beam, and
the set of receive beams, including the particular receive beam, is derived from the set of transmit beams.

11. The communication method as claimed in claim 10, wherein
one or more of the receive beams of the set of receive beams:
has a larger beam width than another receive beam of the set of receive beams, and/or
covers different angular sectors than another receive beam of the set of receive beams, and/or
are only a subset of the transmit beams used in the beacon transmission phase for transmitting data.

12. The communication method as claimed in claim 11, further comprising adjusting any of the beam width, the angular sectors, and a number of the receive beams used in the plural time slots.

13. The communication method as claimed in claim 11, further comprising controlling the beamforming circuitry to control the antenna circuitry to transmit, in the beacon transmission phase prior to the beamforming training phase, information about correspondence between the transmit beams of the set of transmit beams and at least the particular receive beam of the set of receive beams.

14. The communication method as claimed in claim 10, wherein the scheduling information further indicates whether the communication device is transmitting in a certain time slot and/or which other communication device is allowed to transmit in the certain time slot.

15. The communication method as claimed in claim 10, further comprising controlling the antenna circuitry to transmit correspondence information in the beacon transmission phase, the correspondence information indicating a correspondence between a transmit beam used by the communication device in the beacon transmission phase for transmitting data in a particular time slot and a receive beam used by the communication device in the beamforming training phase for listening in a particular time slot.

16. The communication method as claimed in claim 10, further comprising controlling the antenna circuitry to select a sequence of narrow and wide transmit beams used for transmitting data in the beacon transmission phase allowing the other communication device to determine in which time slot to transmit data with a selected transmit beam.

17. The communication method as claimed in claim 10, further comprising controlling the antenna circuitry to transmit data in the beacon transmission phase in data units, with each respective data unit comprising a beacon frame and one or more training units, such that a beacon frame of a data unit is transmitted using a particular transmit beam having a narrower beam width than the one or more training units of the data unit.

18. A non-transitory computer-readable recording medium that stores therein a computer program product, which, when executed by a communication device including antenna circuitry and beamforming circuitry, causes the communication device to:
transmit and receive radio frequency (RF) signals with another communication device;
perform beamforming;
transmit, in a beacon transmission phase prior to a beamforming training phase, scheduling information and data using a set of transmit beams in plural time slots; and
listen, in the beamforming training phase, using a particular receive beam of a set of receive beams in plural time slots, wherein
the set of receive beams, including the particular receive beam, is different than the set of transmit beams in terms of one or more of beam width, angular sector, number, and order,
the scheduling information includes information identifying a time slot in which the particular receive beam will be used by the communication device for listening in the beamforming training phase,
the scheduling information indicates a number of time slots in which the communication device listens with the particular receive beam, and
the set of receive beams, including the particular receive beam, is derived from the set of transmit beams.

19. The non-transitory computer-readable recording medium according to claim 18, further causing the communication device to control the beamforming circuitry to control the antenna circuitry to transmit, in the beacon transmission phase prior to the beamforming training phase, information about correspondence between the transmit beams of the set of transmit beams and at least the particular receive beam of the set of receive beams,
   wherein the particular receive beam is wider than each individual transmit beam of the set of transmit beams of the beacon transmission phase.

\* \* \* \* \*